United States Patent [19]

Yanagimachi et al.

[11] 3,932,698
[45] Jan. 13, 1976

[54] MULTIPLEX SIGNAL TRANSMISSION SYSTEM

[75] Inventors: Akio Yanagimachi, Kawasaki; Osamu Yamada, Kodaira; Hisakichi Yamane, Tokyo; Eiichi Sawabe, Machida; Takashi Uehara, Inagi; Takehiko Yoshino, Yokohama; Teruhiro Takezawa, Komae; Michio Masuda, Tokyo; Hiroaki Nabeyama, Yokohama; Masaaki Fukuda, Kodaira; Tatsuo Kayano, Hachioji, all of Japan

[73] Assignees: Nippon Hoso Kyokai; Hitachi, Ltd.; Hitachi Electronics, Ltd., all of Tokyo, Japan

[22] Filed: Aug. 27, 1973

[21] Appl. No.: 391,977

[30] Foreign Application Priority Data
Sept. 4, 1972  Japan.................. 47-88554

[52] U.S. Cl......... 178/5.6; 178/DIG. 23; 179/15 BY
[51] Int. Cl.².......................................... H04N 7/08
[58] Field of Search.......... 178/5.6, DIG. 23, 5-8 R; 179/15 BY, 15 BS, 15 AP

[56] References Cited
UNITED STATES PATENTS

| | | | |
|---|---|---|---|
| 3,576,391 | 4/1971 | Houghton | 178/5.6 |
| 3,666,888 | 5/1972 | Sekimoto | 178/69.5 TV |
| 3,740,478 | 6/1973 | Breant et al. | 179/15 BS |
| 3,742,145 | 6/1973 | Clark et al. | 179/15 AP X |
| 3,795,763 | 3/1974 | Golding et al. | 178/5.6 |

Primary Examiner—Benedict V. Safourek
Assistant Examiner—Mitchell Saffian
Attorney, Agent, or Firm—Stevens, Davis, Miller & Mosher

[57] ABSTRACT

A multiplex signal transmission system in which a plurality of information signals, having respectively arbitrary time durations and being arranged in time-serial form, are sequentially divided into a plurality of signal portions by a predetermined time period, said signal portions being successively allocated in time-parallel form to a plurality of transmission channels, each of which has a time duration of said predetermined time period, and being transmitted repeatedly through respectively allocated channels every said time duration, comprises a channel shift means for shifting sequentially the channel allocation of said signal portions at predetermined time periods, and a signal transmitting means for transmitting in time-parallel form said signal portions derived from said channel shift means repeatedly through every preceding channels. Consequently, the transmission line can be efficiently utilized in such a way that, at the sending end, a plurality of information signals having respectively arbitrary time durations are folded into a plurality of transmission channels having given time periods, and besides that, at the receiving end, once a portion of any desired information signal is caught in a corresponding channel, successive signal portions can be derived sequentially from the same channel every said given time periods. Hence, a channel selecting means of a receiver in this system can be simplified.

21 Claims, 39 Drawing Figures

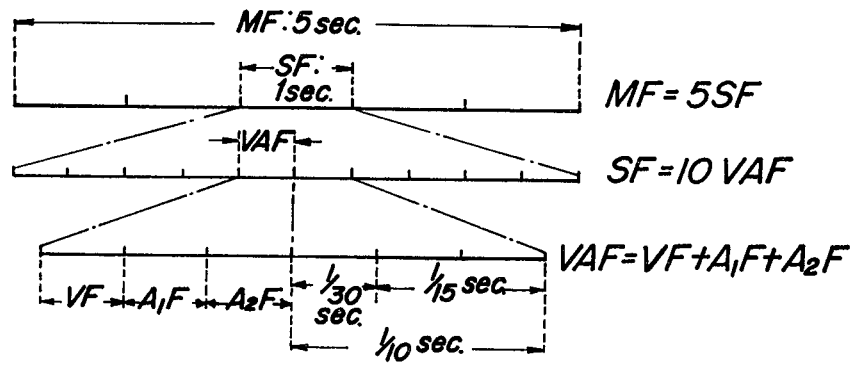
FIG_1a
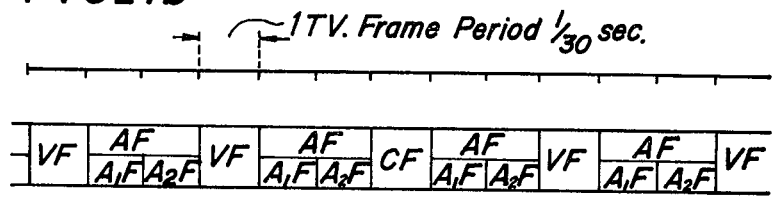
FIG_1b
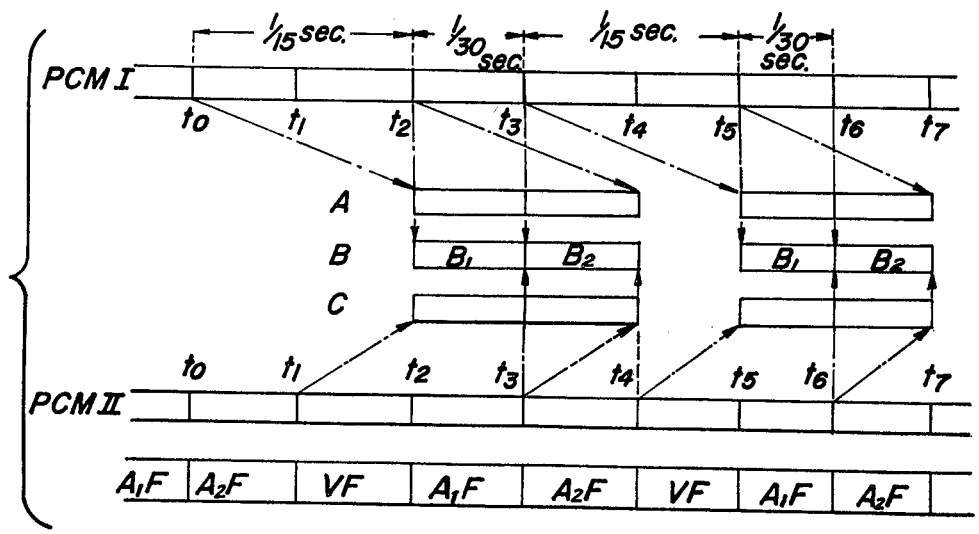
FIG_1c

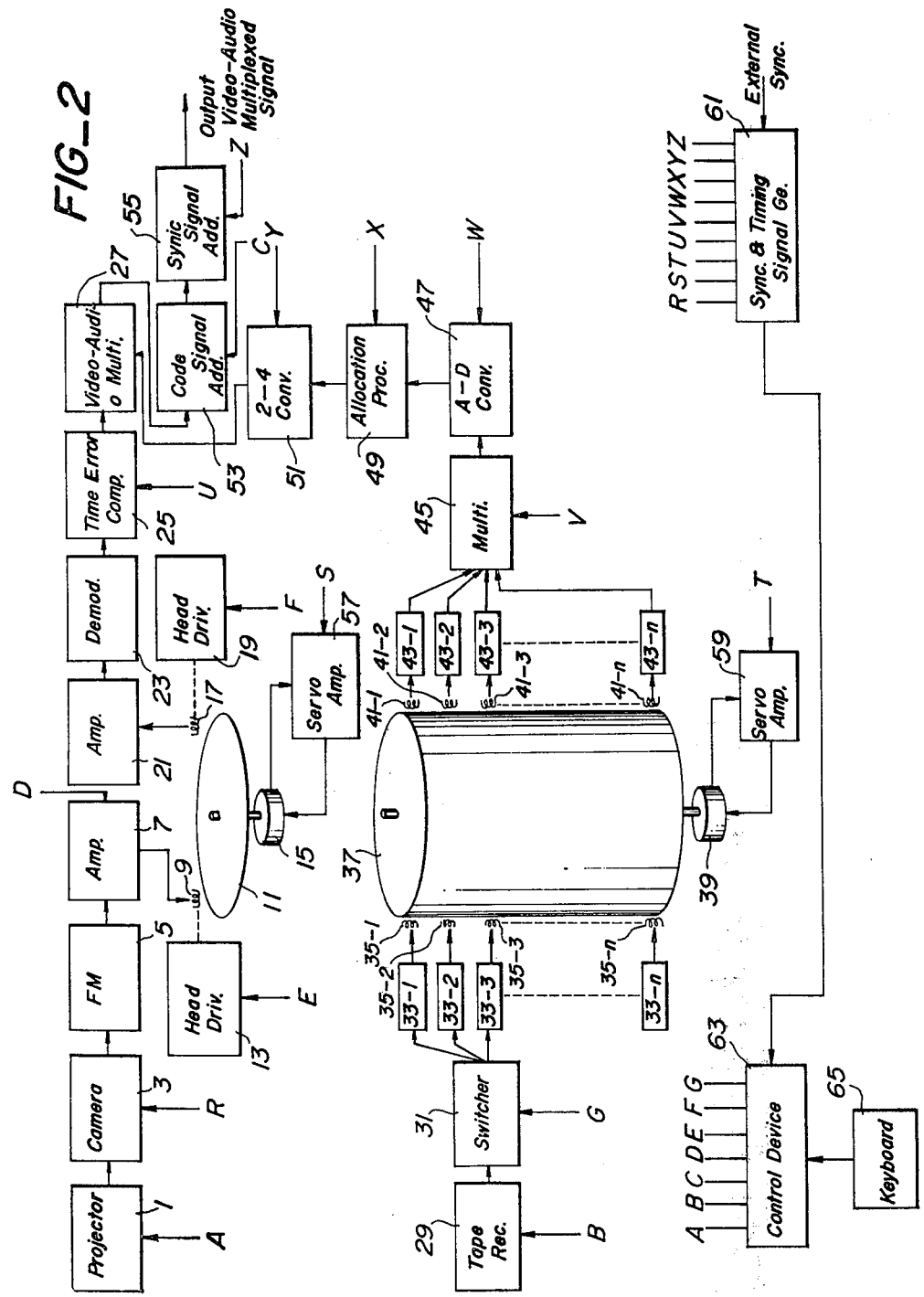

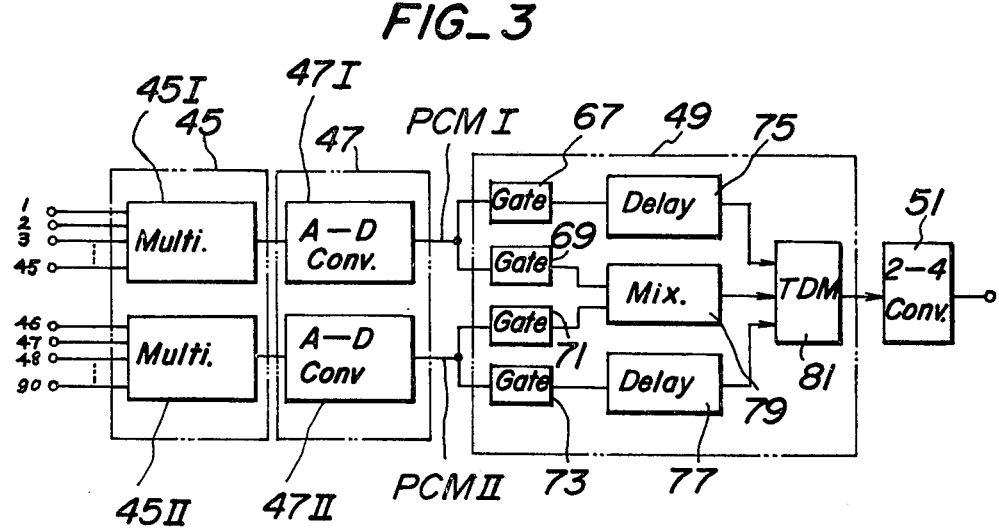
FIG_3
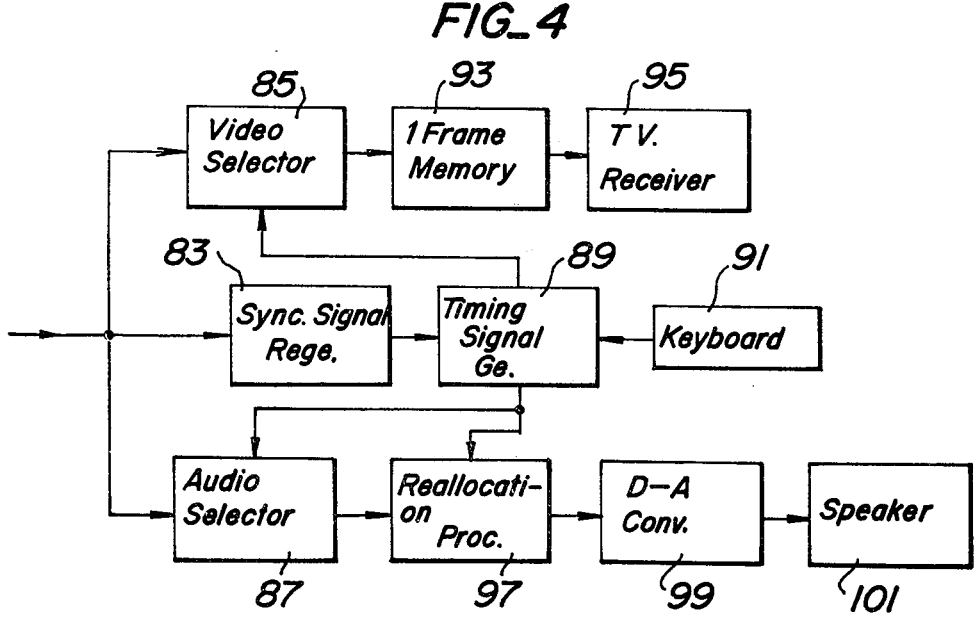
FIG_4

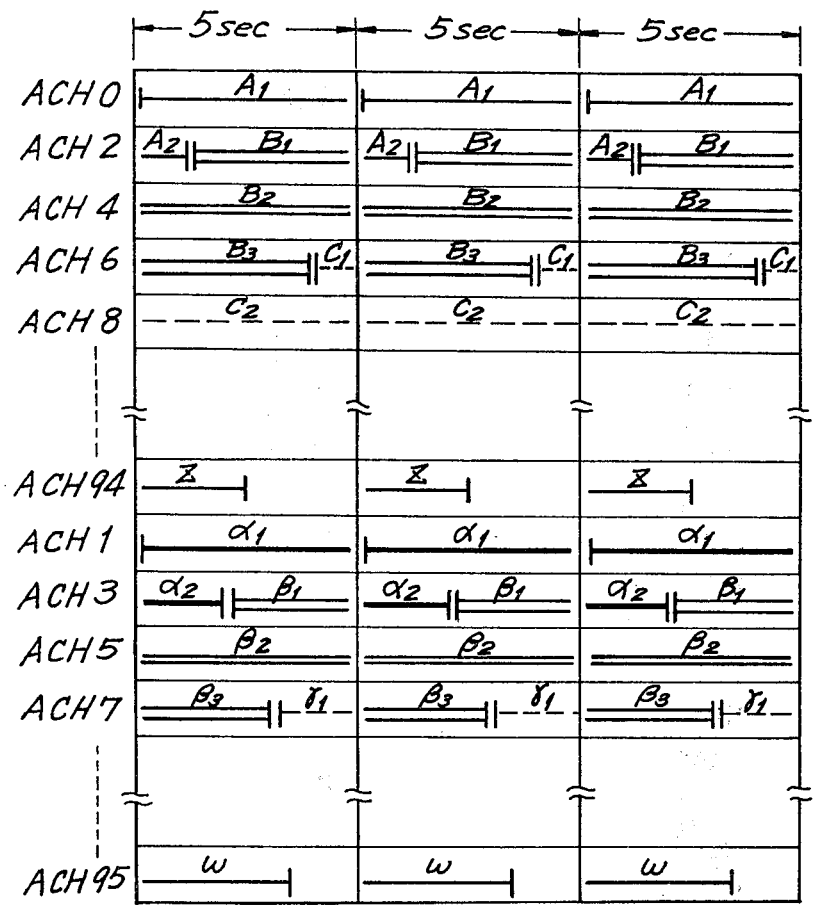

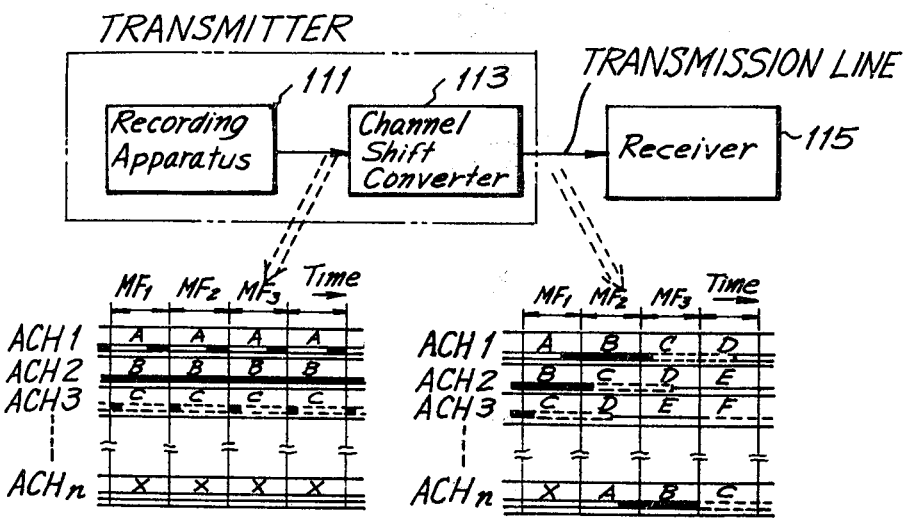

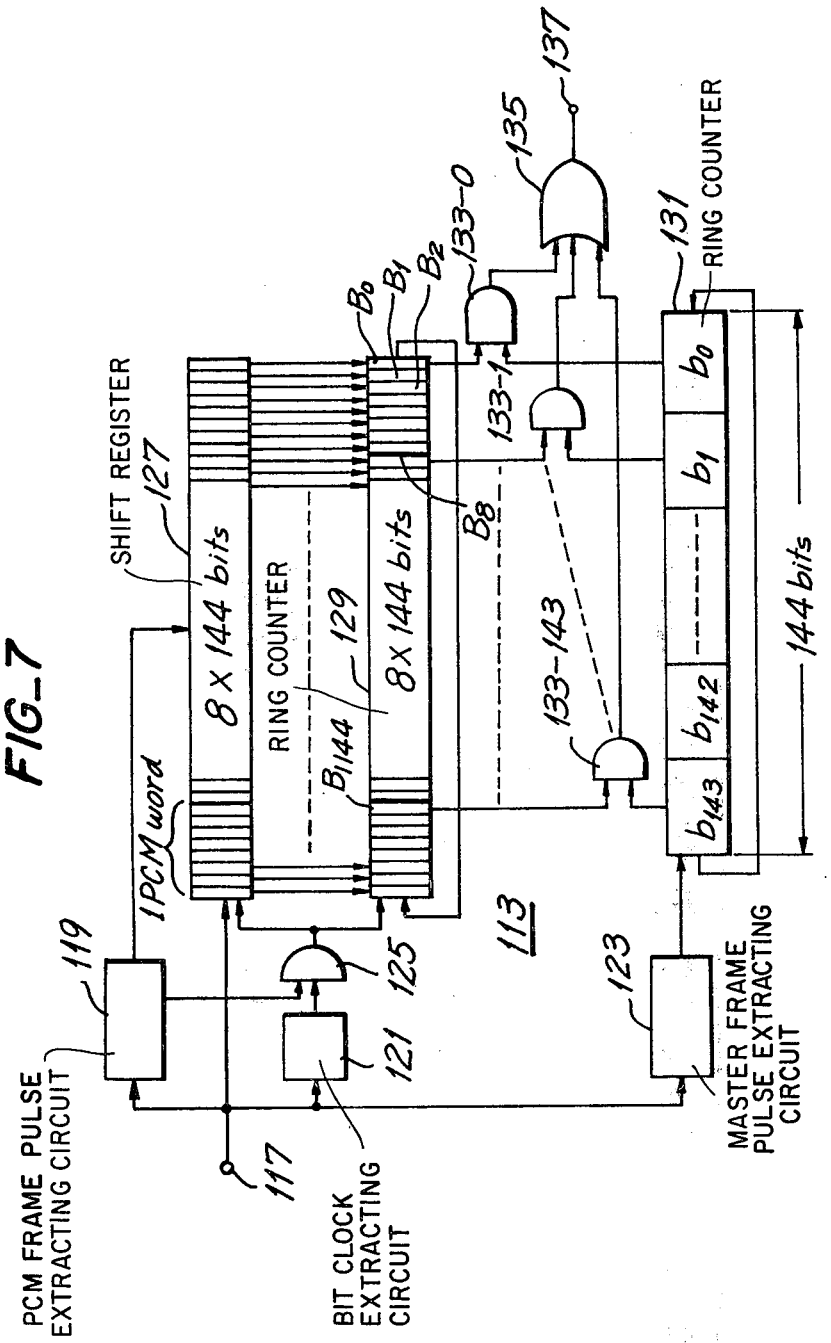

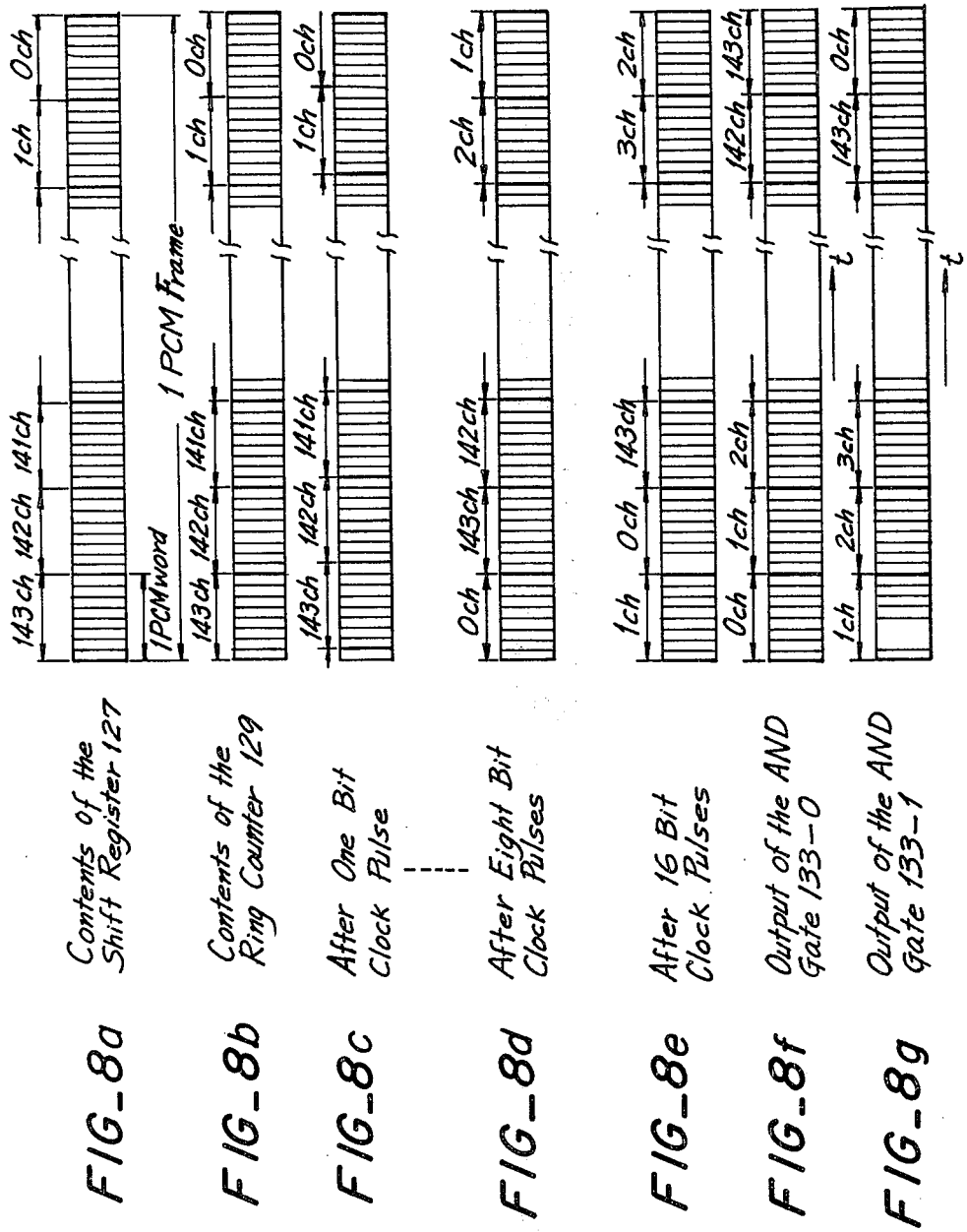

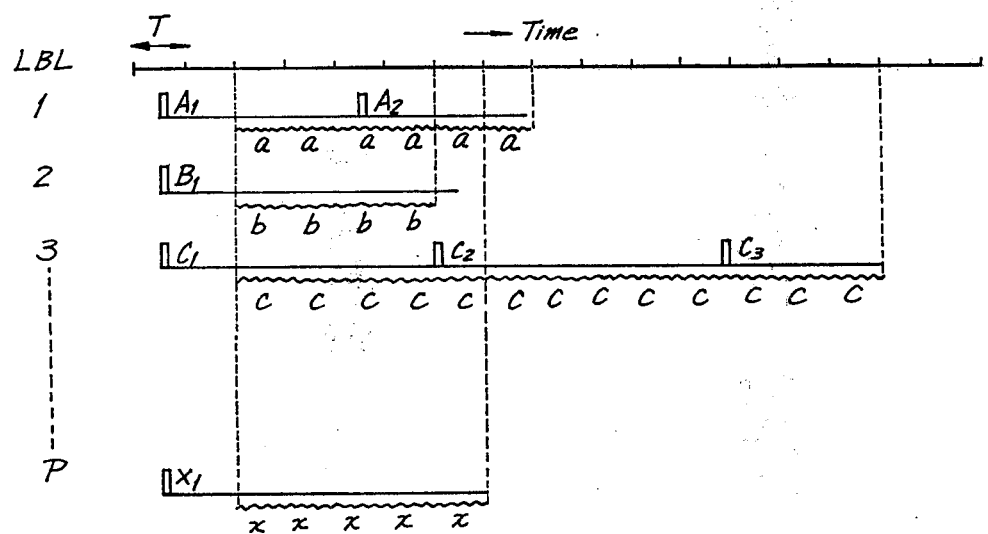
FIG_9

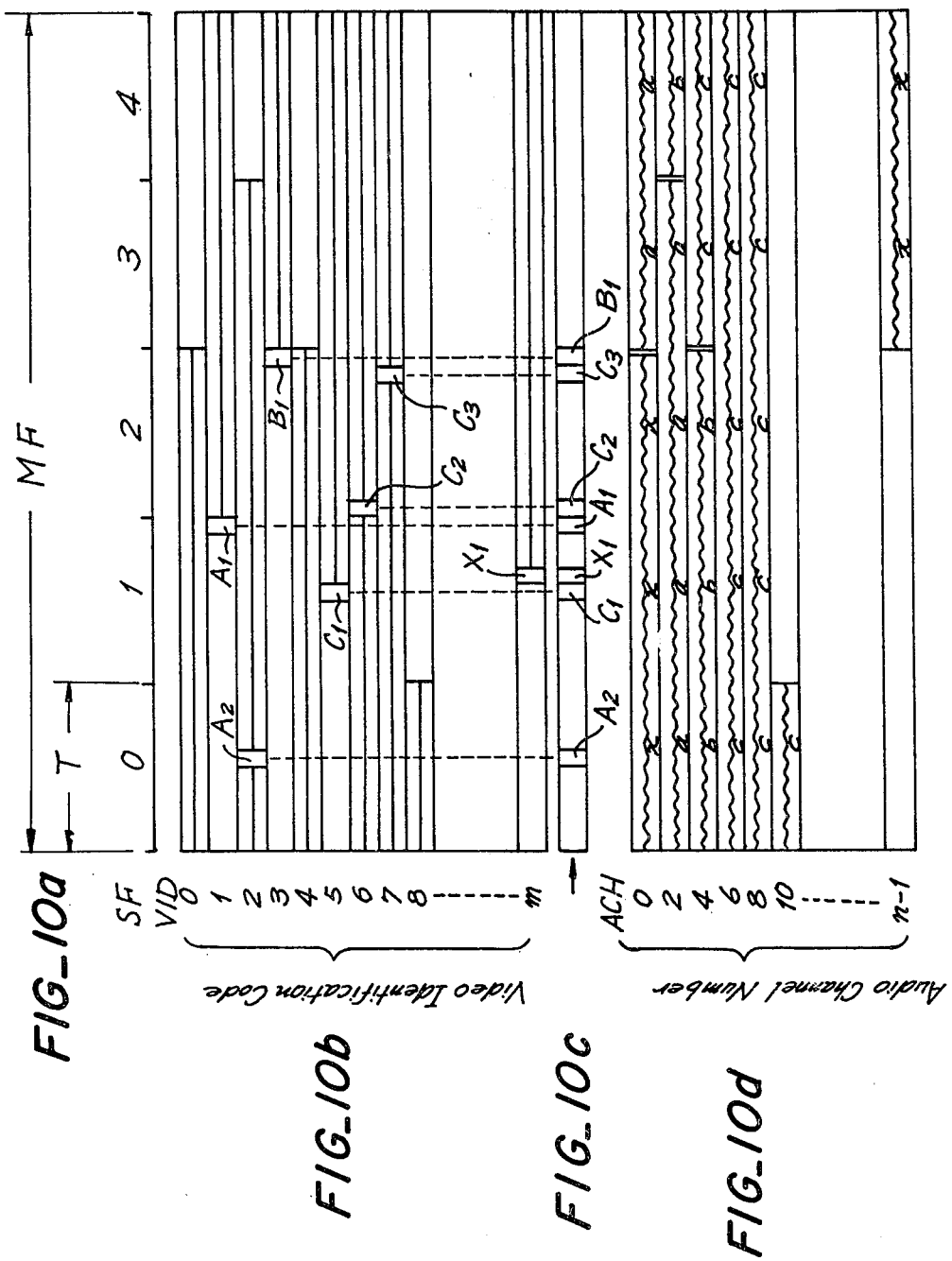

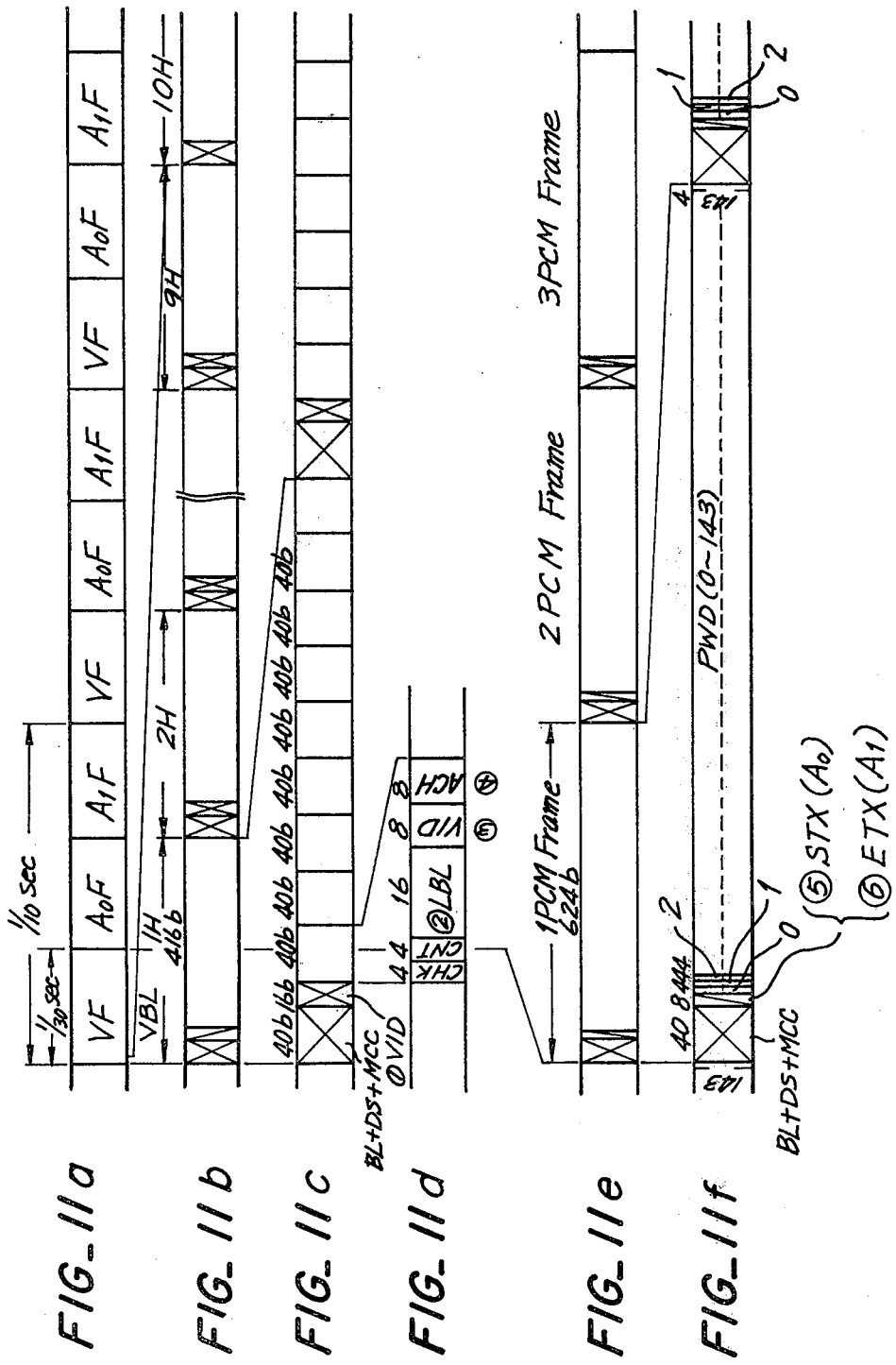

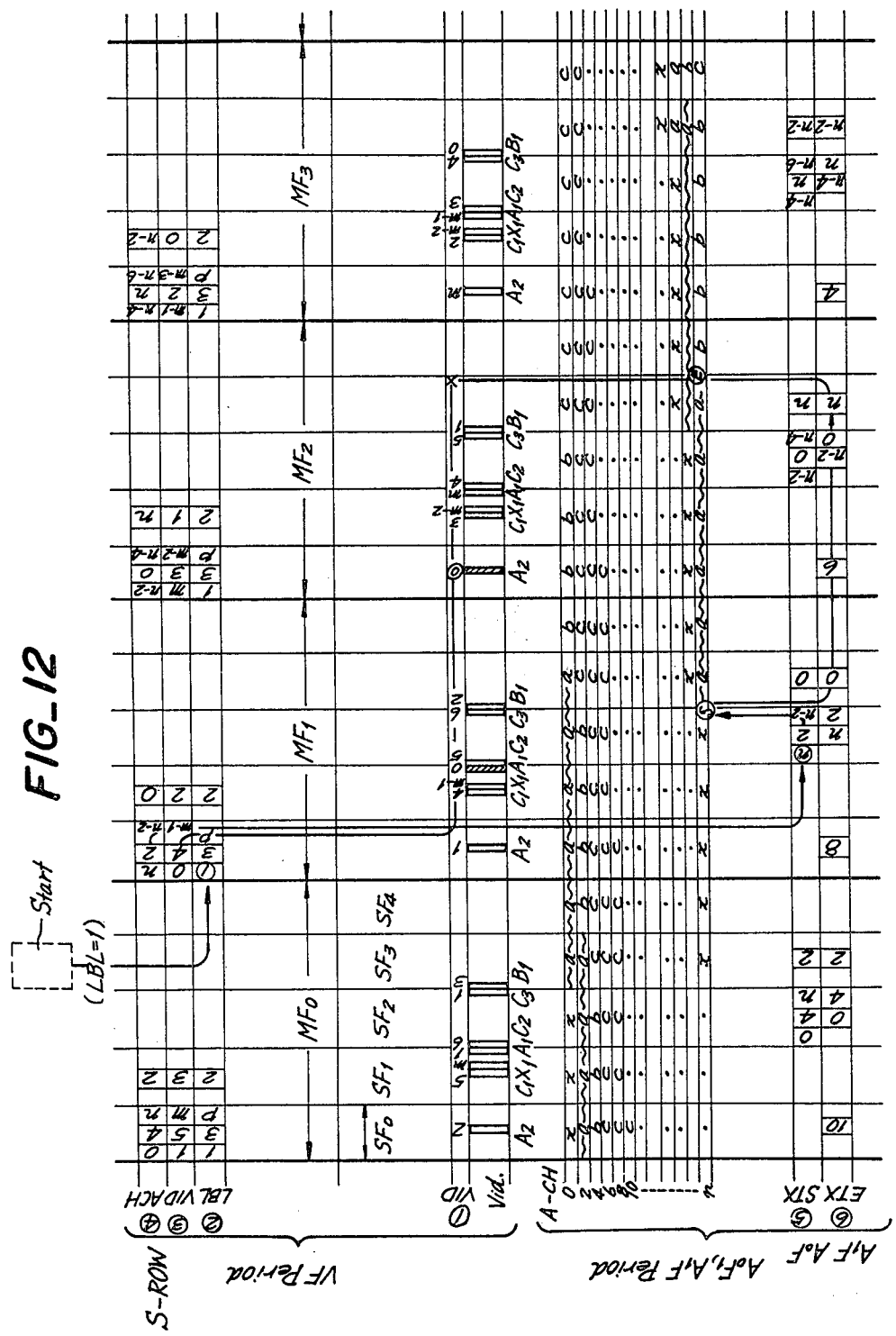
FIG_12

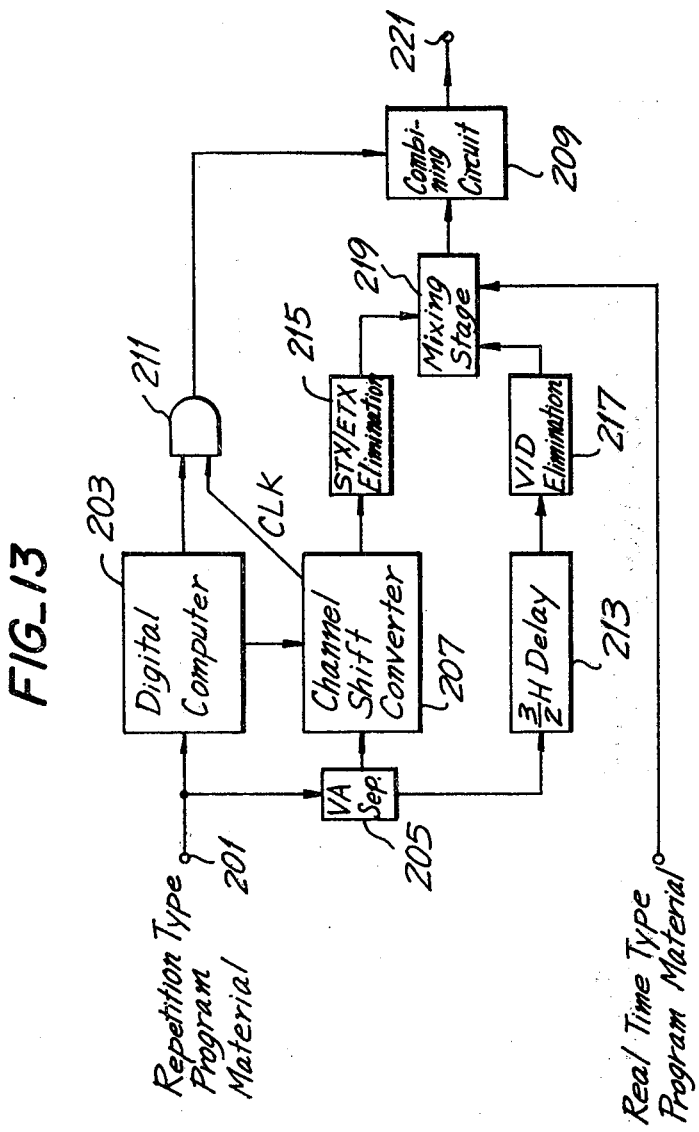

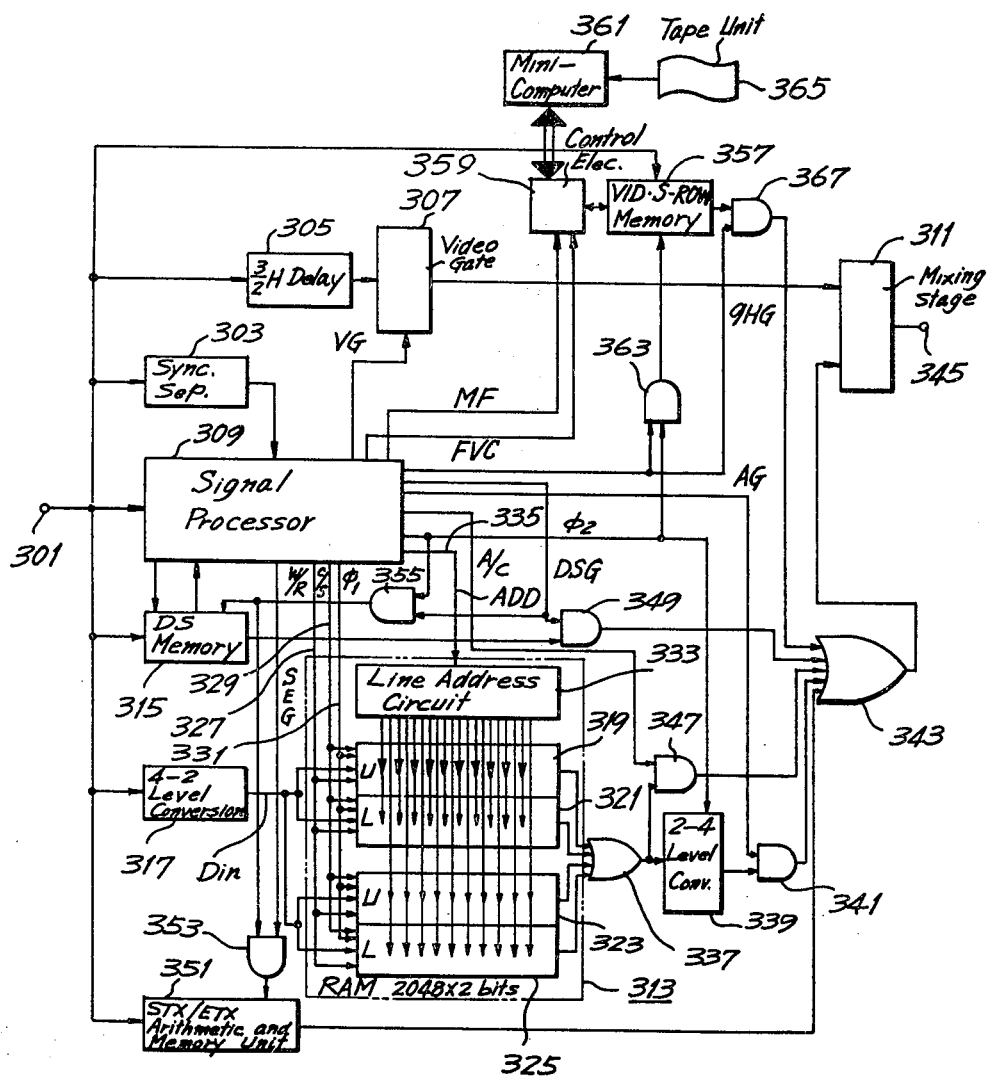
FIG_14

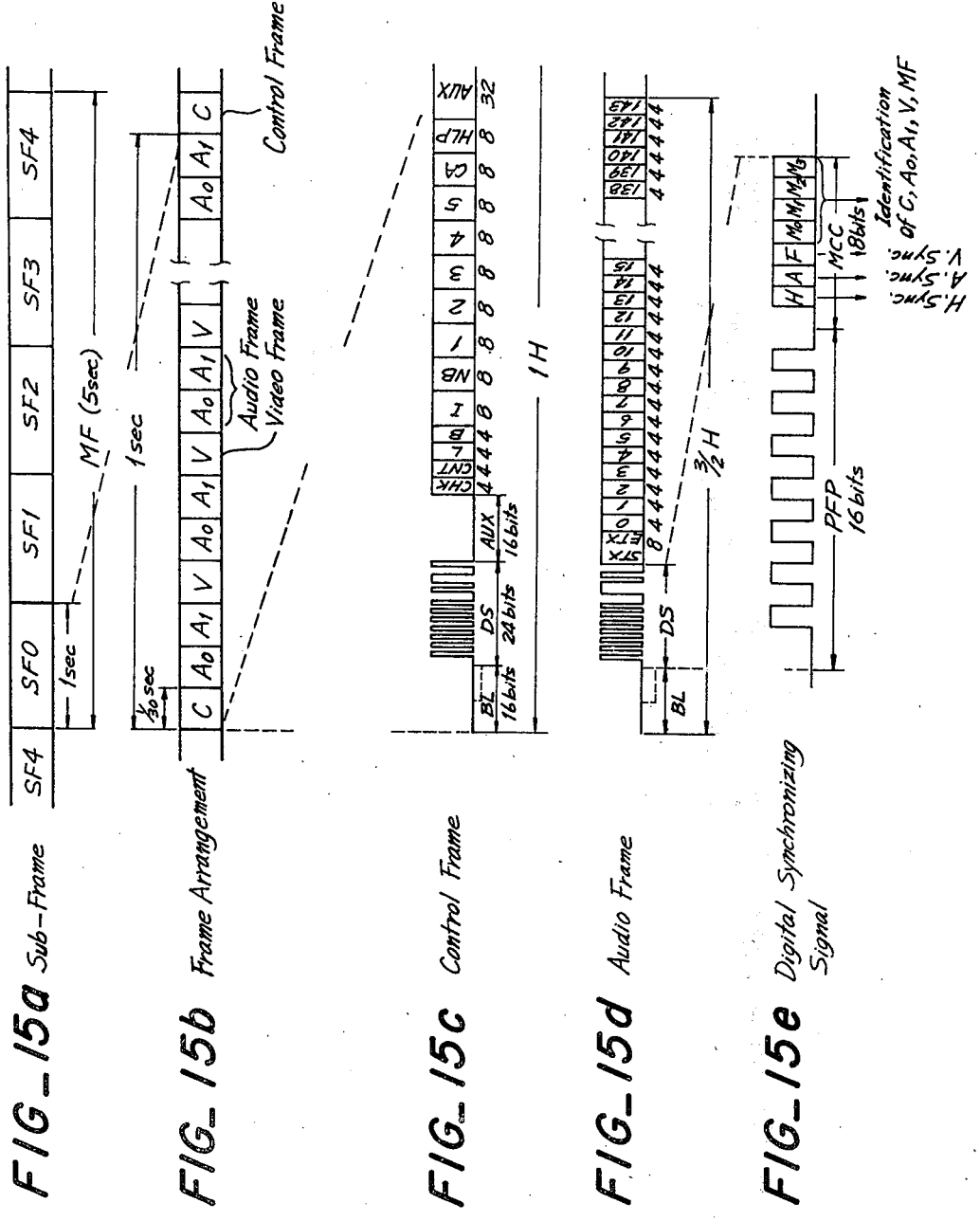

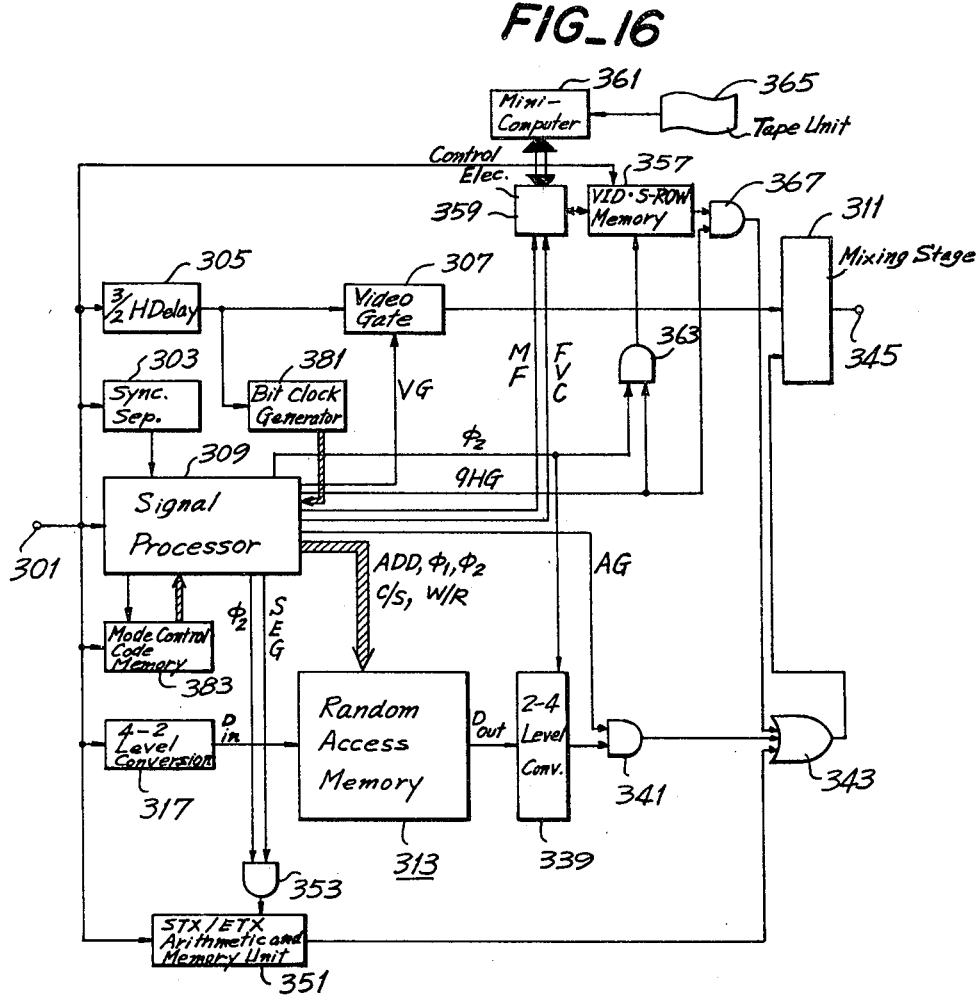
FIG_16

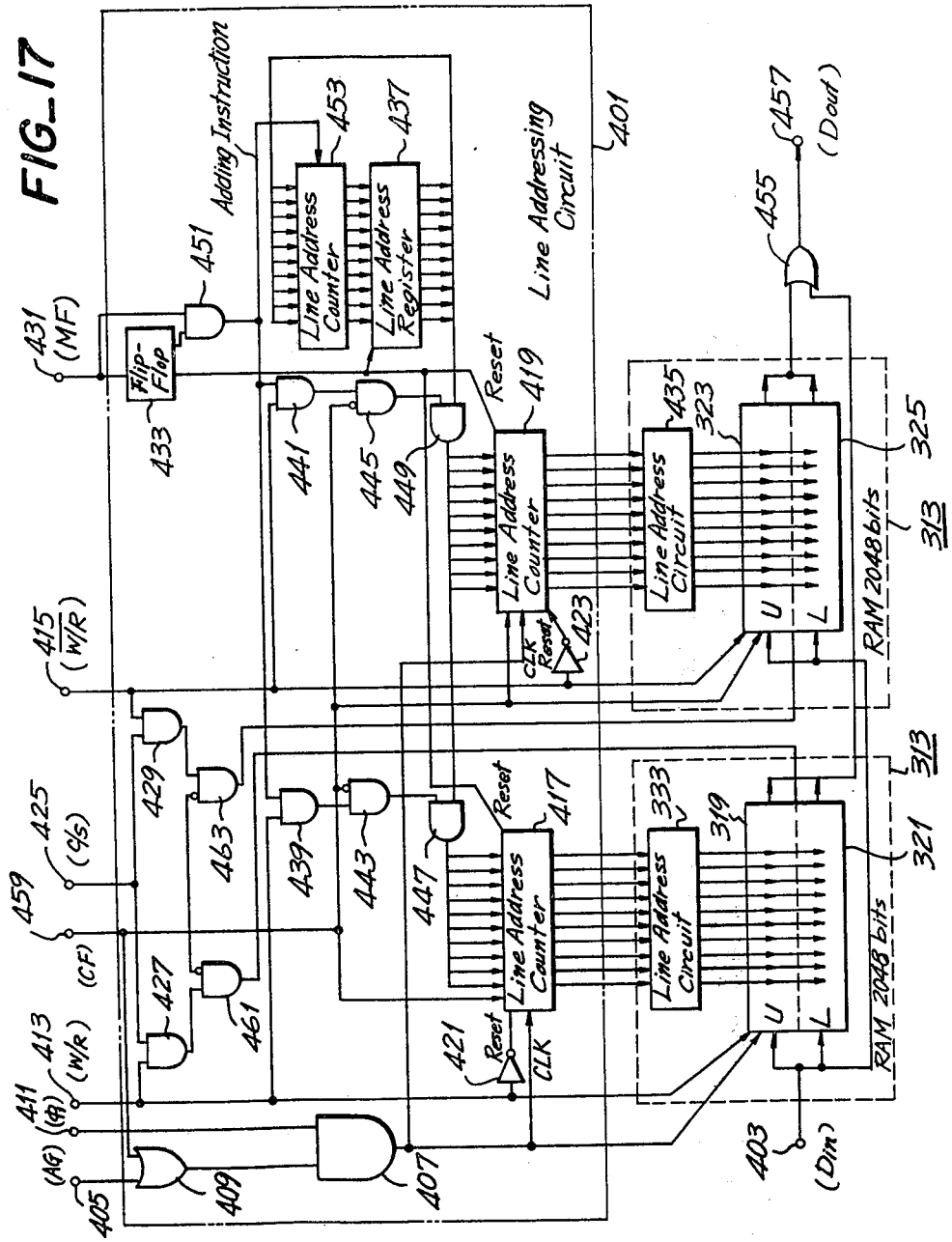

MULTIPLEX SIGNAL TRANSMISSION SYSTEM

The present invention relates to a multiplex signal transmission system in which a plurality of signals having arbitrary time durations are transmitted in a given time duration through a plurality of channels.

In a multiplex signal transmission system, for example in a still picture and related audio signal transmission system, a plurality of information signals divided alternately into given different time durations having an arbitrary integer ratio with each other are repeatedly transmitted at given time periods.

Before the present invention is explained, the still picture transmission system will be firstly described. In this system the signals divided into given different time durations are television picture signals of a plurality of still pictures and audio signals in the form of PCM signals related to the still pictures and these signals are transmitted alternately.

The present inventors have developed a time division multiplexing transmission system for transmitting video signals of a plurality of still pictures and pulse code modulated e.g. (PCM) audio signals related thereto alternately at a time rate of, for example 1 to 2 television frames.

Now a basic construction of such a transmitting system will be explained with reference to FIGS. 1 to 4. FIG. 1 shows a format of the video-audio multiplexed signal to be transmitted. FIG. 1a denotes a program of 5 seconds. The program is termed as a master frame MF. The master frame MF consists of five sub-frames SF, each of which has a duration of 1 second. As also shown in FIG. 1a, each sub-frame SF consists of 10 video-audio frames VAF and each video-audio frame VAF has a duration of 1/10 seconds. As illustrated in FIG. 1a, each video-audio frame VAF further consists of a video frame VF of one television frame period (1/30 seconds) and an audio frame AF of two television frame period (1/15 seconds). Each audio frame AF further consists of a first audio framd $A_1F$ and a second audio frame $A_2F$, each having one television frame period (1/30 seconds). Thus the master frame MF is composed of frame 150 television frames.

By constructing the master frame MF as mentioned above, in the master frame MF, there may be inserted 50 still pictures. However, in fact, it is necessary to transmit code signals for identifying still pictures and their related sounds and for indicating timings of starts and ends of respective signals. It is advantageous to transmit such code signals in the video frames VF rather than in the audio frames AF. In the present embodiment, code signals are transmitted in a video frame VF of each sub-frame SF. A frame during which the code signals are transmitted is referred to as a code frame CF. FIG. 1b shows a part of the sub-frame SF which includes such a code frame CF. Therefore, in the master frame MF, there are inserted forty five still pictures and then it is required to transmit forty five sounds related thereto, i.e. 45 channels of audio-signals.

Sound like speech or music needs several seconds or more to make sense, because sound is inherently continuous. In the present embodiment the maximum duration of each sound relating to each still picture is limited to 10 seconds. As mentioned above the master frame MF has a duration of only 5 seconds, so that in order to transmit sounds of 10 seconds it is necessary to use the number of transmission channels twice the number of sound channels. That is, in order to transmit sounds of 45 channels relating to 45 still pictures, it is required to establish 90 audio transmission channels. Moreover, it is impossible to transmit audio signals in the video frames VF. Therefore, PCM audio signals must be divided and allocated in the audio frames AF only. In order to effect such an allocation processing for audio signals, the PCM audio signals of ninety channels are divided into two groups PCMI and PCMII as shown in FIG. 1c. Portions of PCMI corresponding to the second audio frames $A_2F$ and the video frames VF are delayed for two television frame periods of 1/15 seconds and portions of PCMII corresponding to the video frames VF and the first audio frames $A_1F$ are delayed for one television frame period of 1/30 seconds. PCM signals thus delayed form audio channels A and C as illustrated in FIG. 1c, respectively. Portions of PCMI and PCMII which correspond to the first audio frames $A_1F$ and the second audio frames $A_2F$, respectively, are directly inserted in audio channels $B_1$ and $B_2$ to form an audio channel B. In this manner in the audio channels A, B and C, there are formed vacant frames which have a time position corresponding to the video frames VF. By effecting such an allocation for the audio signals, in each audio frame AF ($=A_1F+A_2F$) it is necessary to contain a number of audio channels which are equal to one and half times of the number of the channels of the audio PCM signals. In the present embodiment, a hundred and thirty five audio transmission channels have to be provided in each audio frame AF. In this manner, audio signals of 135 channels are inserted in each audio frame AF in the form of PCM signals allocated in given time slots.

An embodiment of a transmitting apparatus for effecting the above mentioned still picture - PCM audio signal time division multiplexing transmission will now be explained with reference to FIG. 2. The transmitting apparatus comprises a video signal processing system and an audio signal processing system. The video signal processing system comprises a random access slide projector 1, on which is loaded slides of still pictures to be transmitted. The projector 1 projects optically an image of a slide of a still picture onto a television camera 3. The camera 3 picks up the image and produces an electrical video signal. The video signal is supplied to a frequency-modulator 5 and a carrier is frequency-modulated by the video signal. The FM video signal is amplified by a recording amplifier 7 and an amplified FM video signal is supplied to a video recording head 9. This head 9 is an air-bearing type floating head and is arranged to face a surface of a magnetic disc memory 11. The head 9 is driven by a head driving mechanism 13 so as to move linearly in a radial direction on the surface of the disc memory 11. The disc memory 11 is preferably made of a plastic disc having a magnetic layer coated thereon. This kind of memory has been described in detail in an NHK Laboratories Note, Ser. No. 148, "Plated magnetic disc using plastic base"; Dec. 1971. The disc 11 is rotated by a motor 15 at a rate of thirty rounds per second. There is further provided an air-bearing type floating head 17 for reproducing FM video signals recorded on the disc memory 11. The reproducing head 17 is also driven by a driving mechanism 19 so as to move linearly in a radial direction on the surface of the disc 11. The magnetic heads 9 and 17 are moved intermittently so that on the surface of the disc 11 there are formed many concentric circular tracks. On each track is recorded the FM video signal for one television frame period corresponding to each still picture. The above arrangement for recording a video signal is a conventional so-called video disc recorder, for example type HS-100 sold from AMPEX Company, used in a usual television station. The reproduced FM video signal derived from the reproducing head 17 is supplied to a reproducing amplifier 21 and the amplified FM video signal is further supplied to a frequency-demodulator 23. The demodulated video signal derived from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC". The time-error compensator 25 has a voltage controlled delay line and an error detector, to both of which the demodulated video signal from the demodulator 23 is applied. The error detector also receives the stable timing reference input signal U from the synchronizing and timing signal generator 61 and detects the phase difference between said two input signals so as to produce an error voltage proportional to said phase difference. Said delay line receives the error signal as a control voltage, by which the delay time of the demodulated video signal is controlled to produce a time corrected video output signal having a fixed phase. The time-error compensated video signal is supplied to a video input terminal of a video-audio multiplexer 27.

The audio signal processing system comprises an audio tape recorder 29 of the remote controlled type. On this tape recorder 29 is loaded a tape on which many kinds of audio signals related to the forty five still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4; . . . 33-n. The amplified audio signals from the amplifiers 33-1, 33-2, 33-3, . . . 33-n are supplied to audio recording heads 35-1, 35-2, 35-3, . . . 35-n, respectively. There is provided an audio signal recording magnetic drum 37 which is rotated by a driving motor 39 at a rate of 1 revolution for 5 seconds. As already described above each sound corresponding to each still picture lasts at the longest for 10 seconds, so that each audio signal of each sound is recorded on two tracks of the magnetic drum 37 by means of each pair of audio recording heads 35-1, 35-2; 35-3, 35-4; . . . 35-n. That is, a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 42-3, . . . 41-n, the number of which corresponds to the number of the audio recording heads 35-1, 35-2, . . . 35-n. In the present embodiment $n=90$. The reproduced audio signals are amplified by reproducing amplifiers 43-1, 43-2, 43-3, . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. This PCM audio signal is further supplied to an audio allocation processor 49 in which the PCM audio signal is allocated in the audio frames AF as explained above with reference to FIG. 1c. The detailed construction and operation of the audio allocation processor 47 will be explained later. The PCM audio signal supplied from the processor 49 is a two-level PCM signal. This two-level PCM signal is converted in a two–four level converter 51 into a four-level PCM signal. The four-level PCM audio signal is supplied to an audio signal input terminal of the video-audio multiplexer 27. In the multiplexer 27, the video signal derived from the time-error compensator 25 and the four-level PCM audio signal derived from the two-four level converter 51 are multiplexed in a time division mode. A multiplexed video-audio signal derived from the multiplexer 27 is supplied to a code signal adder 53 which adds to the multiplexed video-audio signal the code signal for selecting desired still pictures and their related sounds at a receiving end to form the signal chain shown in FIG. 1b. The signal chain derived from the code signal adder 53 is further supplied to a synchronizing signal adder 55 in which a digital synchronizing signal is added to form an output video-audio signal to be transmitted.

In the transmitting apparatus shown in FIG. 2, there are further provided servo amplifiers 57 and 59 so as to maintain the rotation of the video disc memory 11 and the audio magnetic drum 37 constant.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47, the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of a code signal, etc. The control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively.

FIG. 3 shows a detailed construction of the audio allocation processor 49. In FIG. 3, there are also shown the multiplexer 45, the A–D converter 47 and the two-four level converter 51. When independent audio signals of 90 channels are to be transmitted, they are divided into two groups each including 45 channels. These two groups of audio signals are supplied to a pair of multiplexers 45I and 45II and a pair of A–D converters 47I and 47II, respectively, to form a pair of PCM time division multiplexing signals PCMI and PCMII as shown in FIG. 1c.

The audio allocation processor 49 comprises gates 67, 69, 71 and 73. The signal PCMI is supplied to the gates 67 and 69 and the other signal PCMII is supplied to the gates 71 and 73. To the gate 67 is applied such a gate signal derived from the synchronizing and timing generator 61 shown in FIG. 2 that the gate 67 is opened for two frame periods $t_0-t_2$, $t_3-t_5$ . . . and closed for one frame period $t_2-t_3$, $t_5-t_6$ . . . every three frame periods. To the gate 69 is applied a gate signal which has a polarity reversed to that of the gate signal supplied to the gate 67, so that the gate 69 is closed for two frame periods $t_0-t_2$, $t_3-t_5$ . . . and opened for one frame period $t_2-t_3$, $t_5-t_6$ . . . every three frame periods. The gate 71 is opened for two frame periods $t_1-t_3$, $t_4-t_6$ . . . and closed for one frame period $t_0-t_1$, $t_3-t_4$ . . . every three frame periods, but delayed for one frame period with respect to the gate 67. The gate 73 is closed for two frame periods $t_1-t_3$, $t_5-t_6$ . . . and opened for one frame periods $t_0-t_1$, $t_3-t_4$ . . . every three frame periods, but delayed for one frame period with respect to the gate 69. The construction and operation of these gates are well-known in the art, so that a detailed explanation thereof is not necessary. To an output of the gate 67 is connected a delay circuit 75 which delays input signals by two frame periods and to an output of the gate 73 is connected a delay circuit 77 which delays input signals by one frame period. A mixing circuit 79 is connected to both outputs of the gates 69 and 71. Output signals of the delay circuits 75 and 77 and the mixing circuit 79 are supplied to a time division multiplexing device 81 to form a time division multiplexed signal.

The signal PCMI is gated out by the gate 67 for a period $t_0-t_2$ and delayed by the delay circuit 75 for two frame periods to form the signal A shown in FIG. 1c. The other signal PCMII is gated out by the gate 73 for a period $t_1-t_3$ and delayed by the delay circuit 77 for one frame period to form the signal C shown in FIG. 1c. Moreover, a signal portion of the PCMI for a period $t_2-t_3$ is gated out by the gate 69 to form the signal $B_1$ shown in FIG. 1c and a signal portion of the PCMII for a period $t_3-t_4$ is gated out by the gate 71 to form the signal $B_2$ also shown in FIG. 1e. The signals $B_1$ and $B_2$ are mixed in the mixing circuit 79 and transferred to the time division multiplexing device 81 as a third channel signal B.

To the time division multiplexing device 81 are also supplied the first and second audio channels A and C to form the PCM-TDM audio signal which is further supplied to the two–four level converter 51.

In the manner mentioned above, it is possible to form a vacant frame for a period $t_1-t_2$ and the video signal can be transmitted in such a vacant frame.

In the transmitting apparatus mentioned above, the random access slide projector 1 is controlled by the control device 63 to project successive forty five still pictures and the video recording head 9 is driven by the mechanism 13 so as to face tracks of the disc memory 11. In this case, the video recording head 7 moves in one direction to face alternate 23 tracks so as to record 23 still pictures and then moves in an opposite direction to face the remaining 22 tracks which situate between the tracks on which the video signals of the first 23 still pictures have been recorded. The video recording amplifier 7 receives a gate signal D of 1/30 seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal S supplied from the generator 61. The video reproducing head 17 is driven by the mechanism 19 in the same manner as the video recording head 9. The reproducing head 17 is moved in the audio frame and code frame periods and is stopped in the video frame period to reproduce the video signal in a correct manner. The reproducing head 17 reproduces repeatedly the video signal of forty five still pictures.

As already explained, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previously recorded pictures or sounds to new pictures or sounds while reproducing the remaining pictures and sound. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording, a DC current is passed through the video recording head 9 and the previously recorded video signal is erased. Then the new video signal is recorded on the erased track of the disc 11. For sound information, a new sound is reproduced by the audio tape recorder 29 and a given track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Next, a basic construction of a receiver will be explained with reference to FIG. 4. A received signal is supplied in parallel to a synchronizing signal regenerator 83, a video selector 85 and an audio selector 87. In the synchronizing signal regenerator 83, a synchronizing signal is regenerated from the received signal. The synchronizing signal thus regenerated is supplied to a timing signal generator 89. To the timing signal generator 89 is also connected an instruction keyboard 91. The timing signal generator 89 produces timing signals to be supplied to the video selector 85 and the audio selector 87 on the basis of the synchronizing signal derived from the regenerator 83 and the instruction derived from the keyboard 91. The video selector 85 selects a desired video signal and the audio selector 87 selects a desired audio signal related to the desired video signal. The selected video signal of the desired still picture is once stored in an one-frame memory 93. Then the stored video signal of one-frame period is repeatedly read out to form a continuous television video signal. This television video signal is displayed on a television receiver 95.

In the transmission system mentioned above, since each audio signal belonging to each still picture must be transmitted within a time period of 10 seconds, there is a disadvantage that a degree of freedom of expression of programs is limited due to the limited time period of the audio signals.

In order to avoid such a disadvantage, when a plurality of audio signals having arbitrary time periods A, B, C, ... α, β, γ, ... in two groups corresponding to said pair of PCM time division multiplexing signals PCMI and PCMII are repeatedly transmitted at a given time period of, for example, 5 seconds through a plurality of channels ACH 0-95, as shown in FIG. 5, it is proposed at first to connect said plurality of audio signals in serial time, to divide sequentially these serial audio signals every 5 seconds, and to contain sequentially each signal portion of 5 seconds into a respective one of said plurality of channels.

As a result, for example, relating to the audio signal A, the signal portion $A_1$ of 5 seconds is transmitted through the zero channel ACH0, and the remaining signal portion $A_2$ (within 5 seconds) is transmitted through the second channel ACH2. Relating to the signal B following said signal A, the first signal portion $B_1$ is transmitted through said second channel ACH2 during the remaining period after the transmission of said signal portion $A_2$ is completed. Consequently, the signals A and B are transmitted without interruption, and thus no pause portion is occurs in the transmission line. In this way, the audio signals are folded as shown in FIG. 5 every 5 seconds so as to allot sequentially these signal portions into said plurality of channels.

In this manner, the audio signals are arranged in the form shown in FIG. 5, and this signal arrangement is repeated every time period of 5 seconds. At the receiving side, in order to reproduce, for example, the audio signal A, the first portion $A_1$ is reproduced from the zero channel ACH0 during the first 5 seconds and then during the next five seconds the second portion $A_2$ is reproduced from the second channel ACH2. Consequently, the both portions $A_1$ and $A_2$ succeed time-sequentially, so that the original audio signal A can be reproduced.

By means of such a transmission system, it is possible to transmit the audio signals having arbitrary time lengths. However, at the receiver it is necessary to change audio channels to be received sequentially at the interval of the repetition period, so that the construction of the receiver is very complicated. Therefore, such a transmission system is very inconvenient for transmitting a number of audio signals. In order to obviate the above mentioned drawbacks, at the transmitting side, the audio channels ACH1, ACH2, ... ACHn are shifted sequentially to which respective signal portions are alloted at intervals of the repetition period (for instance 5 seconds) so as to change the audio channels sequentially prior to transmission. Then, at the receiving end, the user can listen to and look at a desired program by selecting a corresponding channel once without changing the channels sequentially every repetition period.

The present invention has for its object to provide a signal transmission system in which the transmission line can be efficiently utilized in such a way that audio signals having arbitrary time periods are folded in single portions at intervals of a given time duration such as 5 seconds so as to sequentially allocate these signal portions thus folded into a plurality of channels and that the audio channels, which contain the above allocated signal portions respectively, are sequentially changed at intervals of a given time period so as to derive the successive audio signals from the same channel, every above given time period, delayed by one given time period, once the desired audio signal is received from a corresponding audio channel.

The present invention has for another object to provide a signal transmission system in which the construction of a receiver can be simplified in such a way that the contents of respective channels are shifted to the preceding channel respectively at the transmitting side. By this shifting, the successive audio signals can be always extracted from the same channel every above given time period, delayed by one given time period, once the desired audio signal is reproduced from the corresponding audio channel.

Now the present invention will be explained in detail with reference to the accompanied drawings, in which:

FIGS. 1a and 1b show formats of a master frame, a sub-frame, a video-audio frame and a portion of said frame, respectively, of a video-audio signal to be transmitted, and FIG. 1c shows a principle of the allocation of an audio PCM signal in the still picture transmission system;

FIG. 2 is a schematic diagram of the transmitting apparatus for the still picture and PCM audio signal transmission system wherein these signals are multiplexed in time division;

FIG. 3 is a block diagram showing a detailed construction of the audio allocation processor, the A–D converter and the multiplexer shown in FIG. 2;

FIG. 4 is a block diagram of the basic configuration of the receiver of the multiplex signal transmission system shown in FIG. 1;

FIG. 5 is an explanatory diagram of the signal arrangement of the audio signal in a repetition type transmission system;

FIG. 6a is a block diagram showing a general idea for realizing a multiplex signal transmission system according to this invention in a PCM multiplex system;

FIGS. 6b and 6c show channel arrangements before and after channel shift, respectively;

FIG. 7 is a logical block diagram of an embodiment of an audio signal converting portion of the channel shift converter in FIG. 6a;

FIGS. 8a–8g are explanatory diagrams of the operation of the channel shift converter in FIG. 7;

FIG. 9 is an explanatory diagram of an embodiment of the present invention applied to the still picture-audio PCM signal transmission system;

FIG. 10a shows frame scales;

FIG. 10b is an allocation map for the video signal in case of repeatedly transmitting the signals of a plurality of sets of program materials;

FIG. 10c shows a video transmission time slot;

FIG. 10d is an allocation map for the audio signal in case of repeatedly transmitting the signals of a plurality of sets of program materials;

FIG. 11a is a signal format of the video and audio signals;

FIG. 11b is a signal format of the VBL portion of the video frame;

FIGS. 11c–11f are bit arrangements of the control code signals to be transmitted;

FIG. 12 is an explanatory diagram showing the transmitted signals processed in the manner shown in FIG. 11;

FIG. 13 is a block diagram of a basic configuration of a transmitting apparatus having a channel shift converter according to this invention;

FIG. 14 is a block diagram of an embodiment of a signal processing apparatus of the transmitting side in the still picture-audio transmission system according to this invention;

FIGS. 15a and 15b are explanatory diagrams of the multiplexed video-audio signal in a still picture transmission system;

FIG. 15c shows a signal format of the control frame in the still picture transmission system;

FIG. 15d shows a signal format of the audio frame in the still picture transmission system;

FIG. 15e shows a signal format of the digital synchronizing signal in the audio frame;

FIG. 16 is a block diagram of another embodiment of the transmitting apparatus according to this invention in the case of applying this invention to the still picture transmission system; and FIG. 17 is a block diagram of an embodiment of configurations of the random access memory and the line addressing circuit in FIG. 14.

FIG. 6a shows a general idea of this invention, in which one group of audio signals is employed for the sake of explanation. A reference numeral 111 denotes a recording apparatus at the transmitting side. This recording apparatus 111 has n audio channels ACH1-ACHn, as shown in FIG. 6b. A plurality of audio signals A, B, C, ... X are serially connected and are sequentially recorded in these channels by folding them every master frame period MF so as to form one loop of channels in which said serially connected audio signals are recorded. If the signal group composed of one loop is reproduced, the same signal pattern is reproduced repeatedly every master frame period MF, as shown in FIG. 6b.

A reference numeral 113 denotes a channel shift converter which receives a loop-like signal of FIG. 6b so as to change the channel arrangement of the loop-like signal of FIG. 6b to that of FIG. 6c. That is, in case of one audio signal being transmitted by one audio channel and the following audio signal being transmitted by the audio channel next to said audio channel, the audio signal to be contained in one audio channel is sequentially changed every master frame period MF so as to transmit said following audio signal, which has been transmitted by the next audio channel, through said one audio channel i.e. the preceding audio channel, for instance the signal which has been transmitted through the second channel being transmitted through the first channel, the signal which has been transmitted through the third channel being transmitted through the second channel after one master frame period, and so on. In the embodiment of FIG. 6a according to this invention, the aforementioned channel changing is performed in the converter 113 by shifting sequentially the contents of respective channels. A plurality of signals allocated sequentially to the n channels form one loop of signals, so that the signal which has been transmitted through the first channel is contained in the nth channel of the following master frame period. That is to say, the audio signals contained in each channel are shifted to the preceding channel which has a channel number smaller by one (since audio signals are grouped in one group in this case) every master frame period, and this shifting operation is repeated so as to circulate this shifting process. As a result, whereas the audio signal B derived from the recording apparatus 111 is contained sequentially in three channels ACH1-ACH3 as shown in FIG. 6b, in case of receiving the transmitted signal derived from said channel shift converter 113 by a receiver 115, if the reproduction of the signal B is started on the channel ACH1 of the master frame $MF_1$, the whole portions of signal B can be reproduced sequentially from the first channel ACH1 by the receiver 115, since the whole portions of signal B are allocated only to the first channel ACH1 of every master frame succeeding from $MF_1$ to $MF_2$, from $MF_2$ and to $MF_3$.

FIG. 7 is a logical block diagram showing an embodiment of an audio signal converting portion of said channel shift converter 113 composed mainly of a shift register and a ring counter in order to realize a multiplex signal transmission system according to this invention in a PCM multiplex system.

In this FIG. 7, a reference numeral 117 denotes an input terminal to which a PCM multiplex signal is applied. This PCM multiplex signal contains 144 channels in one PCM frame. This one channel is formed by one word which has eight bits. Said input PCM multiplex signal is applied to a PCM frame pulse extracting circuit 119, a bit clock extracting circuit 121 and a master frame pulse extracting circuit 123. The PCM frame pulse extracting circuit 119 extracts a PCM frame pulse which occurs at intervals of the PCM frame period and a gate control pulse which occurs at intervals of PCM frame period and which has a pulse width of 144 PCM words. The bit clock extracting circuit 121 extracts a bit clock pulse. The master frame pulse extracting circuit 123 extracts a master frame pulse which occurs at intervals of the master frame period, i.e. 5 seconds. The bit clock pulses derived from the bit clock pulse extracting circuit 121 and the gate control pulse derived from the PCM frame pulse extracting circuit 119 are applied to an AND gate 125 so as to pass the input clock pulses through said gate 125 during every period of 144 PCM words.

These gated clock pulses and the input PCM signal are applied to a shift register 127 having 1152 register elements capable of setting one PCM frame, i.e. 8 bits × 144 channels = 1152 bits. The gated clock pulses are applied in parallel to respective register elements of the shift register 127 so as to set and to shift the input PCM signal during the period of 144 PCM words. After storing the information of the input PCM signal in 1152 register elements, said PCM frame pulse occurs so as to transfer in parallel form the respective outputs stored in said shift register elements to respective counter stages of a ring counter 129 which has counter stages being equal in numbers to said shift register elements, i.e. 1152 stages. Said gated clock pulses are also applied in parallel form to the respective counter stages of said ring counter 129 and the output of the final counter stage of the ring counter 129 is fed back to the input of the first counter stage so as to circulate the PCM signal corresponding to 144 PCM words thus transferred.

The master frame pulse from the master frame pulse extracting circuit 123 is applied in parallel to respective counter stages $b_0-b_{143}$ of a second ring counter 131. The number of said counter stages is equal to the number of channels in one PCM frame, i.e. 144. Only the counter stage $b_0$ is set initially to "1" and the remaining stages $b_1-b_{143}$ is set to "0". That is, the counter ($b_0, b_1, ..., b_{143}$) is reset to (1, 0, ..., 0). The output of the counter stage $b_{143}$ is fed back to the counter stage $b_0$. Under such an initial condition, said "1" signal set initially in the counter stage $b_0$ is circulated in the sequence of $b_0, b_1, ..., b_{143}$ by the master frame pulses derived from said circuit 123, so that the outputs of respective counter stages $b_0, b_1, ..., b_{143}$ become "1"

sequentially.

The outputs of the first counter stage $B_0$ of the ring counter 129 and the first counter stage $b_0$ of the ring counter 131 are applied to an AND gate 133-0. The outputs of the eighth counter stage $B_8$ of the ring counter 129 and the second counter stage $b_1$ of the ring counter 131 are applied to an AND gate 133-1. And in similar way, the counter stages $B_{16}$ and $b_2$ are applied to an AND gate 133-2, ..., and the counter stages $B_{144}$ and $b_{143}$ are applied to an AND gate 133-143.

The output of these AND gates 133-0 to 133-143 are applied to an OR gate 135, so that this OR gate produces an output signal when either one of said AND gates 133-0 to 133-143 produces a "1" output signal. The OR output thus obtained is derived from the output terminal 137.

Next, the operation of the channel shift converter 113 shown in FIG. 7 will be explained with reference to FIGS. 8a–8g.

The input PCM multiplex signal applied to the shift register 127 through the input terminal 117 is sequentially written in the shift register 127 by the gated bit clock pulses derived from the AND gate 125 as shown in FIG. 8a. Then the PCM signal stored in the shift register 127 as shown in FIG. 8a is transferred to the ring counter 129 in parallel form by the PCM frame pulse derived from the frame pulse extracting circuit 119. The transferred signal shown in FIG. 8b is the same as the stored signal shown in FIG. 8a. In the ring counter 129, this transferred signal is circulated sequentially step by step by said gated clock pulses as shown in FIGS. 8c, 8d and 8e. After one bit clock pulse, the contents of respective counter stages are shifted to the following stage. Thus, after 8 and 16 bit clock pulses, the transferred PCM signal is shifted by one channel and two channels, respectively.

On the other hand, in the ring counter 131, the "1" signal initially set in the first counter stage is circulated sequentially step by step by the master frame pulses whenever one master frame is changed to the following master frame. If it is assumed that the content of the counter stage $b_0$ of the ring counter 131 is "1" and that the AND gate 133-0 is on, the sequential signals derived from the counter stage $B_0$ of the ring counter 129 are applied to the output terminal 137. Namely, the PCM signal is shifted step by step by the bit clock pulses, so that the signals of the 144 sequential channels (from the channel zero to the channel 143) are derived from the AND gate 133-0 as shown in FIG. 8f. The signals thus derived is applied to the output terminal 137 through the OR gate 135. This condition is kept during one master frame period, and under such a condition, a new PCM signal is transferred to the ring counter 129 every PCM frame and is obtained from the AND gate 133-0.

Then, when the master frame is changed, the content of the counter stage $b_1$ of the ring counter 129 becomes "1", so that the AND gate 133-1 becomes on. In this case, the transferred PCM signals are derived from the counter stage $B_8$ of the ring counter 129. Hence, the bit position from which said signals are derived is shifted by the bit length equal to one channel. Consequently, the transferred PCM signals are derived from the AND gate 133-1 in the sequence of channels 1ch, 2ch, ... 143ch, 0ch as shown in FIG. 8g. This condition is kept during the relevant master frame period.

To sum up, whereas the shift register 127 and the ring counter 129 operate in the same mode during every master frame period, in the ring counter 131 the counter stage having the "1" signal is shifted step by step in the sequence of $b_0, b_1, ..., b_{143}$, so that the AND gate being on is also shifted step by step in the sequence of 133-0, 133-1, ..., 133-143. Consequently, the bit position from which the output signals of the ring counter 129 are derived is shifted by one channel sequentially, so that the channel arrangement of the output signals is sequentially shifted at the interval of the master frame period. In such a way, the output signals from the output terminal 137, the channel arrangement of which is shifted by one channel at intervals of one master frame period, form a loop-like signal, as shown in FIG. 6c.

Next an embodiment of the present invention which is applied to the still picture-audio PCM signal transmission system will be explained with reference to FIG. 9. In this embodiment the same signal is repeatedly transmitted at given periods. As shown in FIG. 9 many still pictures $A_1, A_2, B_1, C_1, C_2 ... X_1$ and sounds $a, b, c ... x$ are combined to compose a plurality of program materials each having a given time period. In this case the audio signals have been previously processed to have time lengths which are equal to integer multiples of a unit time length T. To these program materials are affixed labels LBL (LBL=1, 2, ... P).

The signals of these program materials are inserted in the master frame MF (having a duration of 5 seconds) consisting of 50 video-audio frames VAF each of which is composed of a video frame of one television frame length and an audio frame of two television frame lengths as shown in FIG. 1a.

FIG. 10 illustrates allocation maps for repeatedly transmitting the signals of P sets of program materials and for converting them into multiplexed signals. The P sets of program materials are separated into the video and audio signals which are recorded as the multiplexed signals in accordance with the allocation map. FIG. 10a shows frame scales SF and MF. SF is a sub-frame, and five sub-frames SF form one master frame MF. T is a unit time length. FIG. 10b shows an allocation map for the video signal, FIG. 10c shows a video transmission time slot and FIG. 10d shows an allocation map for the audio signal. In FIG. 10b, VID is a video identification number in the case of transmitting the video signals in time-division multiplexing with one frame unit. Each video signal is transmitted with a code signal denoting the identification number affixed thereto. In FIG. 10d ACH denotes channel numbers in multiplexing channels through which the audio signals are transmitted in a time division multiplexing mode. In the embodiment shown in FIG. 10, the video allocation map is divided by the video identification numbers VID= 0 to VID=$m$ and the audio allocation map is divided by the audio channel numbers ACH=0 to ACH=$n$. These maps are further divided by the sub-frame time interval SF=0 to SF=4. Although the audio channel numbers ACH are shown only as even numbers, they may be any numbers and moreover they may be arranged in any order. This may be also applied to the video identification numbers VID. The unit of the time interval SF is made equal to said unit time T (for example 1 second) by means of which the audio signals are divided and thus the whole time length MF of five sub-frames SF=0 to SF=4 is equal to an integer multiple of T (for example 5 seconds). The time length of the master frame MF corresponds to the period of repeated transmission.

The program materials are sequentially arranged according to the allocation map. As illustrated in FIG. 10 the video signal $A_1$ of the first program material having the label LBL=1 is allotted at a position denoted by VID=1 and SF=1 on the allocation map. A position of the video signal $A_1$ of the program material of LBL=1 is so determined that the video signal $A_1$ precedes a start of the audio signal by a given time period (for example $\pm J/2$). In FIG. 10 the start of the audio signal $a$ is set at a position denoted by ACH=0 and SF=3.

When the video signal $A_2$ of the program material of LBL=1 is allotted on the map, the construction of the program material of LBL=1 shown in FIG. 9 is taken into account and the video signal $A_2$ is allotted to a position denoted by VID=2 and SF=0. The audio signal $a$ is allotted to successive positions of 6T period denoted by ACH=0, SF=3; ACH=0, SF=4; ACH=0, SF=4; ACH=2, SF=0; ... ACH=2, SF=3. In the manner mentioned above, the first program material of LBL=1 has been allotted and then the second program material of LBL=2 is allotted. In this case the second program material of LBL=2 is so allotted that its audio signal $b$ succeeds to the audio signal $a$ of the first program material of LBL=1. That is, the audio signal $b$ is allotted to positions denoted by ACH=2, SF=4; ACH=4, SF=0; ACH=4, SF=1 and ACH=4, SF=2.

In order to make the video signal $B_1$ to lead the audio signal $b$, by the unit time period T it is desirable to allocate the video signal $B_1$ to a position denoted by VID=2 and SF=2. But in fact, the video signal $B_1$ cannot be allotted to such a position, so that it is allotted to a position of VID=3 and SF=2. In this manner the number of VID becomes much more than the number of corresponding ACH. But, whereas the number of ACH corresponds to the number of channels which are really occupied by the audio signals, the number of VID corresponds only to the number code signal of the video identification code, word. Even if the number of VID increases so much as twice, the number code signal of the video identification code word increases at most only by one bit, so that the transmission efficiency does not decrease too much. Contrarily, in view of realizing a highly efficient transmission, it is advantageous to shorten intervals between successive audio signals.

In the above described manner the successive program materials of LBL=3 ... LBL=P are respectively allocated on the allocation map. In this case, the last video identification code word is so allocated that a position VID=m, SF=4 is followed by a position VID=0, SF=0, and as to the audio channel number a position ACH=m, SF=4 is followed by a position ACH=0, SF=0, and consequently the allocation maps of the video identification numbers and the audio channel numbers compose closed loops, respectively. Moreover, the video identification code words are so allotted that the transmission time slots of the video signals in the case of the frame time division multiplexing transmission are not superposed with each other. That is to say, the allocation positions of the video identification code words are so adjusted in consideration of the given time period ($\pm T/2$) that projections of these positions $A_1, A_2, ... X_1$ onto a time axis do not overlap one another. In this case, if the allocation positions could not be adjusted to set up the given time period, then the sequence of the programs is changed. Moreover, even when by changing the sequence of the programs, the allocation positions overlap one another, blanks may be inserted between successive audio signals.

According to the editorial map thus formed, the video and audio signals are edited. The form of the signals to be recorded is the same as that of the signal to be transmitted. The signal form is illustrated in FIG. 11a.

As already explained with reference to FIG. 1, the video and audio signals are transmitted in a time division mode by using the frame period (1/30 sec) of the television signal as a unit period. That is, a time division ratio of the video and audio signals is 1:2. Since one still picture is transmitted by one frame, the still pictures can be transmitted at a rate of 10 pictures per second. The audio signals of 96 channels are multiplexed in a PCM signal form with 144(96×3/2) words taking into account the audio allocation treatment shown in FIG. 1c and are transmitted in the audio frames $A_1F$ and $A_2F$. The sampling frequency of the audio signal is 10.5 KHz and the quantization is effected with eight bits (four quaternary digits).

FIG. 11b depicts a portion of the vertical flyback period VBL of the video frame VF in an enlarged scale. During the periods 1H–9H, the control signal is transmitted. In order to maintain the horizontal and vertical synchronization for the whole period of the video frame VF, specified digital synchronizing signals BL+DS+MCC are added at a period of H, but the ordinary synchronizing signal of the television signal is not added. In the audio frame the digital same synchronizing signals are inserted at the PCM frame period of 1/10.5 KHz as shown in FIG. 11e. The digital synchronizing signals are so contracted to maintain the bit synchronization and PCM frame synchronization and to effect video period-audio period mode control and SF switching control. As shown in FIGS. 11e and 11f the audio PCM signal PWD (0–143) and the audio signal transition control signals STX and ETX are inserted in the audio frame at the PCM frame period. In this case in the first audio frame $A_0F$, the audio start signal STX is inserted and in the second audio frame $A_1F$, the audio end signal ETX is inserted. The signals STX and ETX denote the channel number at which the audio signal will start or come to an end.

The signal form of the video period is the same as the television signal except the ordinary synchronizing signal is replaced by the digital synchronizing signal and the control signal is transmitted for the period of 1H to 9H.

In the case of using the multiplex signal transmission system according to the invention for a programmed instruction, many program materials are extracted in a given order at the receiver end. For this purpose it is necessary to transmit a program material control table. This table is composed of many rows and each row comprises a label LBL, the video identification③VID number and the audio channel number④ACH. Here the signal of such one row of the program material control table is denoted as a S-ROW.

In each of the periods 1H to 9H of the vertical blanking portion of the video frame there are transmitted the video identification number①VID of the video signal which is transmitted in the related video frame and nine row signals S-ROW of a program material control table as shown in FIGS. 11c and 11d. The video identification code①VID consists of eight bits and is transmitted twice successively.

As shown in FIG. 11d the row signal S-ROW of the program material control table is composed of a check code word CHK of four bits, a control code word CNT of four bits, the program material②LBL of sixteen bits, the video identification number③VID of eight bits and the audio identification number④ACH of eight bits. In this embodiment the table signal S-ROW is inserted in the vertical blanking period VBL of the video frame VF. The check code word CHK is a complementary number of the sum of the number of "1"s in the binary code words CNT, LBL, VID and ACH. By means of each signal S-ROW, the video identification number VID and the audio channel number ACH of each program are denoted. In FIG. 11c the signal①VID following the synchronizing signals BL+DS+MCC is the identification code word of the video signal belonging to the related transmission period. This identification code word①VID should not be confused with③VID in the signal table S-ROW, because there is not any relation between video signal of the video frame period during which the signal S-ROW is transmitted and the content of this signal S-ROW. During the single H period nine S-ROW signals are transmitted and thus during the single video frame period 81 R-ROW signals of the table are transmitted.

As already described in connection with FIG. 1c, the audio signals are not transmitted in the video frames, but are transmitted only in the audio frames and then at the receiver end the audio signals are exploded into the video frames so as to obtain the continuous audio signals.

The program materials having labels LBL=1, ... LBL=P are edited into the signal form illustrated in FIG. 11 in accordance with the video and audio allocation maps shown in FIG. 10. The signal on one repetition period, i.e. the master frame period MF consisting of five sub-frames $SF_0$ to $SF_4$ is once recorded on the recording device. At the time of transmission this signal is repeatedly reproduced and at the transmitting device the signal conversion is effected so as to shift the channel through which a given audio signal is transmitted.

According to one aspect of the invention, even if the master frame is changed sequentially during during a given audio signal is reproduced from a given audio channel, the successive portion of the given audio signal can be continuously reproduced through the same audio channel. For this purpose at the transmitter end the audio channel is shifted into a next following channel, when the master frame is changed.

FIG. 12 illustrates the transmitted signals which have been processed in the above manner. The signal in a particular master frame $MF_0$ of 5 seconds are the signals of one repetition period which are recorded on the recording device and contain the video and audio signals, the signal table, the video identification signal and the audio start and end control signal. The signal table S-ROW consisting of②LBL,③VID and④ACH is transmitted in the sub-frame period preceding the sub-frame in which the video or audio signal denoted by③VID or ④ACH will be transmitted. For example the video signal $A_1$ of the program material of LBL=1 is transmitted in the sub-frame $SF_1$ and thus the signal table S-ROW of the program material of LBL=1 is transmitted in the sub-frame $SF_0$. The audio start-end control signals⑤STX and⑥ETX are transmitted as the channel number in the sub-frame just before the sub-frame at which the audio signal is started or comes to an end. For example for the audio signal $a$ of the program material having the label LBL=1 which is transmitted through the audio channel 0 from the sub-frame $SF_3$, the audio channel number 0 is transmitted in the sub-frame $SF_2$ in the first audio frame $A_0F$ as the audio start signal STX. The sub-frames $SF_0$, $SF_1$, ... $SF_4$ are transmitted sequentially and after the last sub-frame $SF_4$ is transmitted, the first sub-frame $SF_0$ is once again transmitted. Thus the sub-frames are transmitted cyclically. When a head portion of the program situates in the first sub-frame $SF_0$, the related signal table S-ROW is transmitted in the last sub-frame $SF_4$.

A channel number shifting apparatus comprises first means for arranging the audio channel in such a manner that the audio signal is continued in the same audio channel even if the master frame MF is changed; second means for changing the identification codes affixed to the video signals in such a manner that when at the receiver end the same identification is collated, successive pictures having continuous contents may be obtained (in this case the transmission time slots of the video signals are not changed); third means for changing the signal list in accordance with the rearrangement of the audio channels and the modification of the video identification code words; and fourth means for changing the audio start and end signals in response to the rearrangement of the audio channels. Since the audio channels are divided into the odd and even number groups, and in each group the audio channels are arranged serially to form a loop, when the channel number is decreased by two each time the master frame MF is changed, the same audio signal can be transmitted through the same channel as shown in FIG. 12. This modification of the audio channel number is expressed as follows:

$$ACH(MF_{j+1}) = ACH(MF_j) - 2 \qquad (\text{mod. } n+1)$$

In this case the modification is carried out cyclically with a period of the number n of the audio channels.

Similarly, the video identification number constitutes a loop such as 0, 1, 2, ..., m and thus the video channel number is decreased by one each time the master frame is changed. This modification of the video channel number is expressed as follows:

$$VID(MF_{j+1}) = VID(MF_j) - 1 \qquad (\text{mod. } m+1)$$

Also in this case the modification is effected cyclically with a period of the number m of the video channels. The ACH and VID numbers in the signal table S-ROW are also changed in the same manner as described above. The audio start and end signals STX and ETX are changed in correspondence with the modification of the audio channel number.

When the picture $A_1$ and sound $a$ of the program material of LBL=1 are transmitted, in the first master frame $MF_0$ the picture $A_1$ having the VID = 1 added thereto is transmitted in the sub-frames $SF_1$ and thus in the signal table S-ROW of the program material of LBL = 1 inserted in the sub-frame $SF_0$③ VID = 1 is transmitted. Since the audio signal $a$ is transmitted through the audio channel ACH=0 from the sub-frame $SF_3$, in the signal table S-ROW,④ACH = 0 is added to LBL=1, VID=1. As the audio start signal STX the channel 0 is transmitted in the sub-frame $SF_2$. Since the audio signal continues for six sub-frame periods, after the sub-frame $SF_4$, the audio signal $a$ is transmitted through the audio channel A-CH=2 in the sub-frame $SF_0$–$SF_3$. But for the convenience of the receiver, in the master frame $MF_1$ succeeding from the master frame $MF_0$, the portion of the audio signal which is to be transmitted through the channel A-CH=2 for the period $SF_0$–$SF_3$ is shifted to the audio channel A-CH=0 and transmitted through this channel A-CH=0. A head portion of the audio signal a in the sub-frames $SF_3$–$SF_4$ is shifted to the audio channel A-CH=n. In order to transmit the video signal $A_2$ succeeding to the video signal $A_1$ with the same VID number, in the master frame $MF_1$,①VID = 1 is added to the video signal $A_2$ in the sub-frame $SF_0$ and①VID = 0 is added to the video signal $A_1$. Thus the signal table S-ROW of② LBL = 1,③VID = 1 and④ACH = 0 in the first master frame $MF_0$ is changed to the signal table of②LBL = 1, ③VID = 0 and④ACH=n. The audio end signal for the audio signal a is transmitted as⑥ETX=2 in the sub-frame $SF_3$ of the master frame $MF_0$ and is transmitted as⑥ETX=0 in the sub-frame $SF_3$ of the master frame $MF_1$.

A basic configuration of a transmitting apparatus having a channel shift converter according to this invention will now be explained with reference to FIG. 13.

The video-audio multiplexed signal corresponding to a programed instruction of the repetition type is applied to an input terminal 201. This signal is applied to a digital computer 203 and to a video-audio separator 205. Informations required for channel shift conversion, such as a program repetition period (MF), an audio start channel number (STX), an audio end channel number (ETX), a video identification number (VID), and so on are previously read in by said computer 203. This computer 203 processes said multiplexed signal together with said informations so as to supply a channel shift instruction to a channel shift converter 207 and to supply new numbers VID, STX and ETX, which correspond to the relevant channel shift conversion, to a combining circuit 209 through an AND gate 211 at the timing of a PCM clock pulse. The audio channel shift converter 207 is the same one as already explained with reference to FIG. 7. The separated audio signals from said separator 205 are applied to said channel shift converter 207. Since the audio signal is delayed by 3/2H as described above, the video signal separated from said separator 205 is applied to a 3/2H delay circuit 213 so as to adjust the timing of both video and audio signals. An STX/ETX elimination circuit 215 and a VID elimination circuit 217 eliminate respectively the preceding STX, ETX and VID which exist prior to channel shift. The elimination output signals from the elimination circuits 215 and 217 are mixed by a mixing stage 219. In the case of arranging particular vacant channels for a real time type program, program materials of the real time type may be applied to a further input terminal of said mixing stage 219. The mixed signal from the mixer 219 is the combination of the video and the audio signals without VID, STX and ETX and is applied to said combining circuit 209 in which the new VID, STX and ETX from the AND gate 211 after channel shift are added to said video and audio signals so as to transmit a real time type program from an output terminal 221.

FIG. 14 illustrates an embodiment of a signal processing apparatus of the transmitting side in the still picture-audio transmission system according to this invention. In this signal processing apparatus a random access memory is utilized as a channel shift converter.

In FIG. 14, a multiplexed video-audio signal, as shown in FIGS. 15a and 15b, in a still picture transmission system is applied to an input terminal 301. This input video-audio signal is applied to a synchronizing separation circuit 303 so as to separate in amplitude the horizontal synchronizing signal of the video signal from said input signal. The input video-audio signal is applied to a 3/2H delay circuit 305 and the delayed output is further applied to a video gate 307 to which a video gate signal VG derived from a signal processor 309 is also applied so as to pass the delayed signal during the video period. Consequently, the video signal delayed by a 3/2H period is derived from said video gate 307 and is applied to a mixing stage 311. The reason why the video signal is delayed by the 3/2H period is that the digital signal having the audio PCM signal is delayed by one PCM frame period, i.e. 3/2H period in this signal processing apparatus of FIG. 14 and that it is necessary to adjust the relative timings of these signals.

Said signal processor 309 receives the input video-audio signals so as to produce many kinds of control signals, such as a mode change signal W/R and a chip selection signal C/S for a random access memory (RAM) 313, bit clock pulses $\phi_1$, $\phi_2$, an addressing signal AND for said RAM 313, a control code gate signal A/C, and so forth from many kinds of synchronizing signals in said input video-audio signal. The control code signals shown in FIG. 15c and the audio PCM signals shown in FIG. 15d are applied to the random access memory 313. Here, it is not necessary to shift the channel which contains said control code signals, but in order to coincide the timing of the control code word with that of the audio signal like in the case of the video signal and to avoid the distortion of waveform caused by an analogue delay line, the control code signals are applied to the RAM 313 which acts as a delay circuit for digital reproduction.

In FIG. 15c, BL is a blanking period, DS is a digital synchronizing signal, AUX includes auxiliary bits, CHK includes check bits for parity check, CNT includes control bits, L includes list bits, B includes block bits and I includes item bits for respectively indicating the list, block and item of the relevant video-audio signal. NB is used for indicating the next list and block, 1–5 are for indicating the next items to be able to proceed, CA includes correct answer bits, HLP includes help or hint bits and AUX includes auxiliary bits.

The input video-audio signal is applied to a DS memory 315 so as to memorize the digital synchronizing signal DS at the timing of the gate signal received from the signal processor 309. The detail of the digital synchronizing signal DS is shown in FIG. 15e, in which PFP means a PCM frame pattern comprising digital synchronization pulses and MCC means a mode control code word. Concerning the mode control code word, H is for a horizontal synchronization, A is for a synchronization of audio PCM frames, F is for a synchronization of video frames, $M_0$–$M_3$ are for identifications of C, $A_0$, $A_1$, V, MF, respectively.

The input video-audio signal is also applied to a four-two level conversion circuit 317 in which the four-level PCM input is converted to a two-level PCM signal suitable to be memorized by the RAM 313.

The RAM 313 has four memory chips 319, 321, 323 and 325. Two pairs of chips 319 and 321, and 323 and 325 are alternately used for writing and reading. As ten electrodes are provided for each chip, one chip can write in informations corresponding to 1,024 bits. In each chip pair 319–321, 323–325, the chips 319 and 321 are alternately written in and the chips 323 and 325 are also alternately written in, so that informations of 2,048 bits (1,024 bits × 2) can be stored in one pair of these two chips. Consequently, even if the audio PCM signal is converted from four levels to two levels and the required bits are doubled, this two-level signal can be sufficiently stored. The control code words are previously formed with two-level signals, so that the bit arrangement of the pulse train in not changed even if the bits of the control code words are doubled by the four-two level converter 317. Accordingly, in the pair of chips 319 and 321, it is enough to read out the signal stored in one chip 319.

In order to change the operational mode of the chip pairs 319–321 and 323–325, alternately, from write mode to read mode or vice versa, the mode selection signal W/R is alternately applied to these chips 319, 321, 323 and 325 from the signal processor 309 through a conductor 327. In order to write the audio PCM signals in one of the chips of the one chip pair alternately, the chip selection signal C/S is applied to these chips 319, 321, 323 and 325 through a conductor 329 in an alternate mode.

The input digital signal is written in the chips in the "writing mode" in the RAM 313 after having been converted to the two-level signal by the four-two level conversion circuit 317. At the writing mode, the bit clock pulse $\phi_1$ is applied to the RAM 313 from the signal processor 309 through a conductor 331. When writing is executed, the address of the writing point corresponding to one PCM channel is shifted at the interval of one master frame period. At the reading mode, the written PCM signal is always read out in a given sequence, so that the PCM channels of the read out signal are shifted at the interval of one master frame period.

The addressing signal ADD is applied to a line address circuit 333 from the signal processor 309 through a conductor 335 so as to shift the write address at the interval of one master frame period. The addressing signal ADD shifts the address of the writing point by the unit of one channel at the interval of one master frame. In case of transmission of the control code signal, the control channel is not shifted, and the control code signal is only delayed by 3/2H period, so that the same address is always assigned to this code signal and the written code signal is always read out according to this addressing. This addressing and the operation of the RAM 313 will be described more in detail hereinafter.

The output of the RAM 313 is derived from an OR gate 337 and is applied to a two-four level conversion circuit 339 in which the two-level OR output signal is converted to a four-level signal. This four-level signal and an audio gate signal AG derived from the signal processor 309 are applied to an AND gate 341 from which said four-level signal is derived during the audio PCM signal period as shown in FIG. 15d by the AG signal. This output signal is applied to an OR gate 343. The output of this OR gate 343 is applied to said mixing stage 311. The output of the mixing stage 311 is obtained from an output terminal 345. In case of such control code signals as shown in FIG. 15c, the output of the OR gate 337 and a control code gate signal A/C derived from the signal processor 309 are applied to an AND gate 347. The OR output of the gate 337 is gated out by the A/C signal and is applied to the OR gate 343.

The DS signal derived from the DS memory 315 and the digital synchronization gate signal DSG derived from the signal processor 309 are applied to an AND gate 349. The DS signal is gated out by the DSG signal and is applied to the OR gate 343.

The STX/ETX gate signal is temporarily stored in an STX/ETX arithmetic and memory unit 351. This unit 351 is controlled by an AND gate 353 which receives an STX/ETX gate signal SEG and the output of an AND gate 355 which receives the bit clock pulse $\phi_2$ and the DSG signal. In said unit 351, the amount corresponding to the shift of audio channel is subtracted from the channel number and the subtracted result is determined to be a following channel number after channel shift and is applied to the OR gate 343. In the case of shifting the audio channels by two channels as described above, two channels are subtracted from the channel number and if the resultant becomes a zero channel, then the audio channel is shifted to a 95th channel.

With reference to the VID signal and S-ROW signal added to the video signal, these signals are extracted from the input multiplexed video signals and temporarily stored in a VID·S-ROW memory 357 through the interfacing process of a control electronics 359. This control electronics 359 is constructed as a conventional interfacing circuit comprising AND-gates, an address counter and related control circuits, and receives the master frame pulse MF and a video and control frame pulse FVC from the signal processor 309 and is served for the interface between a mini-computer 361 and the VID·S-ROW memory 357. Said memory 357 is controlled by the AND output signal of an AND gate 363 which receives a 9HG signal and the bit clock pulse $\phi_2$. This 9HG signal is a gate control signal having a pulse duration of a 9H period. The mini-computer 361 is controlled by a tape unit 365 in which a calculation program concerning channel shift of the VID signal and the S-ROW signal is previously read. In this program, the calculation method relating to the ①VID and the ③VID and ④ACH in the S-ROW signal to be shifted are predetermined according to the input signal applied to the terminal 301 and having the signal arrangement as shown in FIG. 12. The VID·S-ROW memory 357 is controlled by said mini-computer 361 so as to change the stored information and the output signal read out from this memory 357 is applied to said OR gate 343 through an AND gate 367 which is controlled by said 9HG signal.

The OR output signal of the OR gate 343 is mixed with the video signal derived from said video gate 307 by the mixing stage 311. The output signal thus mixed is derived from the output terminal 345 and has a frame arrangement as shown in FIG. 15b.

FIG. 16 illustrates another embodiment of the transmitting apparatus according to this invention in the case of applying this invention to the still picture transmission system. In the transmitting apparatus shown in FIG. 14, the digital signal and the analogue signal are processed apart from one another, whereas, in this apparatus shown in FIG. 16, both of the video signal and the control frame signal DS are processed as an analogue signal. Accordingly, the signals which are applied to the mixing circuit 311 through the analogue gate 307 are the video signal and the control signal DS. In order to make different kinds of timing signals delayed by the 3/2H period, the output signal derived from the 3/2H delay circuit 305 is also applied to a bit clock generator 381 so as to extract bit clock pulses which have the frequencies of 6.54 MHz and 13.08

MHz and which are applied to the signal processor 309. In this case, the DS memory 315 in FIG. 14 can be eliminated, and only an MCC (mode control code word) memory 383 is required. The remaining circuit arrangement is quite similar to the arrangement shown in FIG. 14, so that the further explanation will be omitted hereinafter.

FIG. 17 illustrates an embodiment of configurations of the RAM 313 and a line addressing circuit 401. In FIG. 17, reference numerals corresponding to the like components in FIG. 14 are shown with the same numerals.

In FIG. 17, a reference numeral 403 denotes an input terminal (Din) for receiving the digital signal. The input digital signal is applied to the chips of the writing mode and is written therein.

Applied to an AF gate signal input terminal 405 is the audio frame gate signal AG which is applied to an AND gate 407 through an OR gate 409. The clock pulse $\phi_1$ applied to an input terminal 411 is also supplied to said AND gate 407 so as to gate out the clock pulse $\phi_1$ during the audio frame period. This gated clock pulse triggers the RAM 313 so as to write in the digital input signal Din or to read out the written signal. The mode signals W/R and $\overline{W/R}$ having opposite polarities to one another are applied to respective teminals 413 and 415. The W/R signal being "1" is the writing mode, and the W/R signal being "0" is the reading mode. If the signal applied to the terminal 413 is "1", the chips 319 and 321 take a writing mode (since the signal from the terminal 415 is "0") and the chips 323 and 325 take a reading mode. In such a condition, line address counters 417 and 419 receive the W/R and $\overline{W/R}$ signals through inverters 421 and 423, so that the line address counter 419 is in the reset condition and is ready to determine the address for the following writing. From an input terminal 425 the chip selection signal C/S is applied to AND gates 427 and 429 which also receive the W/R and $\overline{W/R}$ signals, respectively. Said C/S signal passes through one of the AND gates 427 and 429, which is conductive in the writing mode, to the chips of the RAM 313 so as to trigger the chips and to change to the writing mode. The master frame pulse MF is applied to an input terminal 431. When the first master frame pulse comes in, a flip-flop 433 becomes on, and the output signal from the flip-flop 433 resets the line address counters 417 and 419 to be "0".

In this "0" condition, the line address circuits 333 and 435 determine the line address to be written in. By this addressing, the signal during the audio PCM period is sequentially written in the chips of the writing mode. Simultaneously, a line address register 437 has been set to "0". Between two chip pairs 319–321 and 323–325 the writing and reading modes are changed alternately to each other. Although either one of the line address counters 417 and 419 is reset in the reading mode, in the following writing mode, through an AND gate 439 or 441 and an inhibit gate 443 or 445 the W/R or $\overline{W/R}$ signal is applied to either one of AND gates 447 and 449 which is conductive in the writing mode, so that the address signal stored on the line address register 437 is transferred to the line address counter 417 or 419 as a logical product signal derived through the AND gates 447 and 449. When the master frame is altered, the master frame pulse MF is applied to the flip-flop 433 and an AND gate 451 through the input terminal 431. To this AND gate 451 applied is the output of the flip-flop 433. Said master frame pulse MF is applied to a line address counter 453 as an adding instruction so as to instruct the addition through the AND gate 451 when the flip-flop 433 is on. In the line address register 437, the "0" value is previously stored, so that the predetermined value stored in the line address counter 453 is added to the "0" value and the added result is stored in the line address register 437.

In this embodiment of FIG. 17, four bits of the four value PCM signal are contained in 144 time slots. On the other hand, in order to insert the video signal between audio signals, the audio signal corresponding to the video signal period is inserted by one channel per two channel, so that there exists the same signal series every third channel. Consequently, one channel can be shifted by shifting the address by bits corresponding to three channels, so that in the line address counter 453, addition by 141 × 4 bits is performed bits instead of subtraction by 3×4 bits.

In this manner, the new addressing code word thus set in the line address register 437 is applied to the line address circuit 333 or 435, whenever the chips of the RAM 313 take the writing mode during the master frame period. In the reading mode, as described above, the line address counters 417 and 419 have been reset to the "0" condition, so that the reading out starts always from the address of the "0" point, and the written signal the channel of which was already shifted in the writing mode is sequentially read out by the bit clock pulse $\phi_1$ derived from the input terminal 411. The read out signal read out from the chips 319, 321, 323 and 325 are applied to an OR gate 455 and the OR output is derived from an output terminal 457 as the digital signal $D_{out}$ effected by the channel shift.

In the case of the control code frame, it is not necessary to convert the transmission channel, so that the control code gate signal CF is applied to an input terminal 459. As the CF signal is the two-level signal, the CF signal can be obtained from either one of the chips, though the CF signal is converted to a four-level signal and is written in the two chips alternately. Considering the above, the CF signal and the AND output of the gate 427 are applied to an inhibit gate 461 and the CF signal and the AND output of the gate 429 are applied to an inhibit gate 463 in such a way that only one chip 319 and 323 of the respective chip pairs are operated during the reading mode. The CF signal also inhibits the inhibit gate 443, so that the AND gates 447 and 449 become off. As the result, the addressing code word of the line address register 437 is not transferred to the line address counter 417 and 419, which always start from the "0" position.

In general, it is not necessary to convert the transmission channel of the control code signal, so that it is not necessary to apply the control code signal to the line addressing circuit 401 and to the RAM 313. On the other hand, the audio signal is delayed by 3/2H due to the channel shift. Hence, the timings of the audio signal and the control code signal are required to be suited to one another. If the control code signal is passed through an analogue-type delay line in such a case, the waveform of the control code signal is deteriorated. Whereupon in this embodiment of FIG. 17, the above described apparatus for the channel shift is used in common for the digital type delay circuit.

According to the present invention, in a multiplex signal transmission system in which a plurality of information signals are repeatedly transmitted at given time intervals through a plurality of channels, the signal having an arbitrary time period is divided into given different time periods at given time intervals and the divided signal portions are allocated into different channels respectively. Here, in this transmission system according to the present invention, the channel arrangement is changed at given time intervals, so that if once the reading of the relevant signal starts from the corresponding channel, then the following signal portions can be always derived from the same channel. Therefore, according to the present invention, the configuration of a receiver can be simplified. Although the signal transmission system according to this invention is of the repetition type, this transmission system can reproduce the signal in the same way as the real time type signal transmission system. Thus, this invention has such an advantageous effect that this system can substantially be used in the receiving apparatus of real time type.

In the above embodiments of the present invention, the transmission system of this invention has been illustrated and described for transmitting still pictures and its related sounds. However, the transmission system according to the present invention is not limited to such a still picture and sound transmission system, and it may be used to transmit television pictures and facsimile signals, or various signals such as remote control signals, audio signals, and facsimile signals in the form of a PCM, PTM, PWM or PAM signal. In addition, it will now be apparent to those skilled in the art that changes and modifications may be made without departing from the invention in its broader aspects, and it is the intention, therefore, in the appended claims to cover all such changes and modifications as fall within the true spirit of the invention.

What is claimed is:

1. A multiplex signal transmission system in which a multiplexed signal composed of several video signals and accompanied PCM-TDM audio signals, said audio signals being multiplexed in time division in the form of pulse code modulation signals having respectively arbitrary time durations and arranged in time-serial form, is sequentially divided into a plurality of signal portions contained in one master frame, said one master frame having several sub-frames, each of which includes a plurality of video-audio frames, each of which includes a video frame and an audio frame which has first and second frames, and in which said signal portions are respectively allocated to a plurality of time-parallel channels, each of which has a time duration of one master frame, and said signal portions being transmitted through respective ones of said plurality of time-parallel channels, repeatedly every one master frame period, comprising:

a channel shift means for shifting sequentially the whole of said signal portions allocated to each of said time-parallel channels every predetermined time period; and a signal transmitting means applied to outputs derived in time-parallel form from said channel shift means and transmitting simultaneously said outputs through respective channels to each of which said signal portions composing respective audio signals are allocated successively every one master frame period, said channel shift means being provided with a shift register for temporarily storing input PCM-TDM audio signals during one frame period of said pulse code modulation signals, a first ring counter to which the PCM-TDM audio signals thus stored in said shift register are transferred in parallel and which circulates the stored audio signals at intervals of one bit clock period of said pulse code modulation signals, a second ring counter, having counter stages corresponding to the number of channels of said PCM-TDM audio signals contained in one frame period of said pulse code modulation signals, for circulating signals stored initially in said second ring counter at intervals of one master frame period, and an AND gate group having AND gates the number of which is equal to that of said channels, and each of which has two input terminals connected respectively to output terminals of counter stages corresponding to a position of a first bit in each word of said pulse code modulation signals stored in said first ring counter and to output terminals of counter stages of said second ring counter, positions of which stages correspond to relevant words of said pulse code modulation signals, whereby said AND gates sequentially become conductive during one master frame period in accordance with stepping of the content stored initially in said second ring counter at intervals of one master frame period so as to derive the PCM-TDM audio signals which circulate in said first counter through relevant AND gates which thus become conductive in such a manner that channels assigned to the PCM-TDM audio signals thus derived from AND gates sequentially conducting are shifted sequentially.

2. A multiplex signal transmission system as claimed in claim 1 wherein a plurality of audio signals are arranged in time-serial form at master frame periods, identification code words are affixed to said plurality of audio signals, respectively, and said audio signals together with said identification code words are respectively transmitted repeatedly at said master frame periods, said multiplex signal transmission system further comprising, at a transmitter, an identification code modification means for sequentially modifying the contents of the identification code words affixed to each of said plurality of audio signals alike to another identification code word affixed to another audio signal at said master frame periods; and a signal transmitting means for transmitting said plurality of audio signals and said sequentially modified identification code words;

and further comprising, at a receiver, a channel selecting means for sequentially detecting said identification code words and for sequentially selecting the signals corresponding respectively to the detected identification code words; and a signal reproducing means responsive to said audio signals selected together with said detected identification code words and arranging said audio signals in time serial form so as to reproduce original audio signals with said audio signals selected through respectively the same channels.

3. A multiplex signal transmission system as claimed in claim 1 wherein said video frame and said first and second frames have one television frame period respectively.

4. A multiplex signal transmission system as claimed in claim 1 wherein said video signals correspond to a still picture.

5. A multiplex signal transmission system as claimed in claim 1 wherein a video identification code word is contained in a video frame so as to identify the channel code of the relevant channel in which a desired video signal is contained.

6. A multiplex signal transmission system as claimed in claim 5 wherein said video identification code word is positioned in the vertical blanking period of the video frame relating to each video signal, and wherein a first control code word indicating an index identifying an information signal composed of several still picture video signals and audio signals, a second control code word indicating several audio channel numbers through which several audio signals denoted by said index are transmitted and a third control code word indicating several video identification codes of said several still picture video signals denoted by said index are transmitted in said vertical blanking period of said video frame, and said video identification code word, said second control code word and said third control code word are sequentially modified to other respectively similar ones in accordance with shifting channels of audio signals every time period equal to one master frame period.

7. A multiplex signal transmission system as claimed in claim 6, wherein audio start and end signals are so inserted in one of said audio frames that said audio start signal denotes the channel number at which the audio signal starts and that said audio end signal denotes the channel number at which the audio signal comes to an end, and wherein said audio start and end signals are modified respectively to other audio start and end signals inserted in other audio signals sequentially in accordance with shifting channels of audio signals every time period equal to one master frame period.

8. A multiplex signal transmission system as claimed in claim 1 wherein channels assigned to respective audio frames are divided into two groups of even and odd number channels, in each of which group the assigned channels are shifted by two channels, respectively, every time period equal to one master frame period.

9. A multiplex signal transmission system as claimed in claim 6 wherein channels assigned to respective audio frames are divided into two groups of even and odd number channels, in each of which group the assigned channels are shifted by two channels, respectively, every time period equal to one master frame period.

10. A channel shift converter of a transmitter in which a multiplex signal composed of several video signals and accompanied PCM-TDM audio signals, the audio signals being multiplexed in time division in the form of pulse code modulation signals, and having respectively arbitrary time durations, is sequentially divided into a plurality of signal portions contained in one master frame, said one master frame having several sub-frames, each of which includes a plurality of video-audio frames, each of which includes a video frame and an audio frame which has first and second frames, and in which said signal portions are respectively allocated to a plurality of time-parallel channels, each of which has a time duration of one master frame period, and said signal portions being transmitted through respective ones of said time-parallel channels repeatedly every master frame period, and in which a video identification code word is contained in a video so as to identify the channel code of a relevant channel in which a desired video signal is contained, said video identification code word being positioned in the vertical blanking period of the video frame relating to each video signal, and further including a first control code word indicating an index identifying an information signal composed of at least one still picture video signal and audio signal, a second control code word indicating at least one audio channel number through which said audio signal denoted by said index is transmitted and a third control code word indicating a video identification code word of said still picture video signal denoted by said index which is transmitted in said vertical blanking period of said video frame, and said video identification code word, said second control code word and said third control code word being sequentially modified to other respectively similar ones in accordance with a shifting of channels of audio signals every time period equal to one master frame period, and further including audio start and end signals having code words and inserted in one of said audio frames so that said audio start signal denotes the channel number at which the audio signal starts and said audio end signal denotes the channel number at which the audio signal comes to an end, and wherein said audio start and end signals are modified respectively to other audio start and end signals inserted in other audio signals sequentially in accordance with a shifting of channels of audio signals every time period equal to one master frame period, comprising:

a gate means for passing therethrough whole signals contained in the video frame;

a random access memory for temporarily storing input PCM-TDM audio signals;

a signal processor for producing recording signals and control signals which are applied to said random access memory so as to shift sequentially the address in which said PCM-TDM audio signals are written every one master frame, and also producing a bit clock signal for reproducing said PCM-TDM audio signals, which is applied to said random access memory so as to sequentially read out the PCM-TDM audio signals stored in said random access memory;

a memory means for storing said video identification code word and said second and third control code words which are modified to other respectively similar ones in said memory means in accordance with shifting channels assigned to the PCM-TDM signals; and an arithmetic and memory means for storing said audio start and end signals the code words of which are modified to other respectively similar ones in accordance with shifting channels assigned to the PCM-TDM signals.

11. A channel shift converter as claimed in claim 10, wherein said signal processor produces an addressing signal which is applied to a line address circuit so as to control addresses for writing of said random access memory.

12. A channel shift converter as claimed in claim 10, wherein said random access memory has a plurality of memory sections divided into halves, both of which are respectively controlled by a read/write mode changing signal from said signal processor in such a manner that one half is in the writing mode while the other half is in the reading mode, alternately.

13. A channel shift converter as claimed in claim 10, wherein one of said input PCM-TDM audio signals is in the form of a four-level PCM signal, which is applied to said random access memory through a four-two level conversion circuit, and wherein the PCM-TDM audio signal read out from said random access memory is applied to a two-four level conversion circuit in which the read out signal is converted to a four-level signal.

14. A channel shift converter as claimed in claim 10, comprising a delay means for delaying signals contained in the video frame by a time duration required to adjust timings of both of said video and audio signals.

15. A channel shift converter as claimed in claim 10, wherein
said signal processor produces a master frame pulse synchronized with said master frame, a mode changing signal for changing the write or read mode of said random access memory, said random access memory having a plurality of sections divided into halves, a memory selecting pulse for alternately selecting either one of said halves in which said PCM-TDM audio signals are written, a control code frame pulse synchronized with a control code frame for a video frame, and a bit clock pulse applied for a line address circuit and said random access memory, comprising:
a first line address counter for adding sequentially numbers of addresses at timings of said master frame pulse instructing the addition, and transferring address code words in parallel at intervals of one master frame;
a line address register for storing temporarily address code words transferred from said first line address counter in parallel at intervals of one master frame and transferring said address code words at the timing of said master frame pulse;
a second line address counter constructed as a pair for receiving address code words transferred from said line address register at the timing of said master frame pulse and each of said pair transferring alternately the address code words to said random access memory at the timing of said mode changing signal so as to assign addresses of memory sections in which input PCM-TDM audio signals are written;
means for producing a logical product signal of said mode changing signal;
a gate means for applying said logical product signal and said memory selecting pulse to said pair of the second line address counter, so as to change the modes of said both halves of the memory sections alternately; and
an inhibit gate means for interrupting the application of said logical product signal to said pair of the line address couanter and the transfer of said address code words to said pair of the line address counter at the timing of the control code frame pulse.

16. A multiplex signal transmission system as claimed in claim 1 comprising a transmitter.

17. A multiplex signal transmission system as claimed in claim 2, wherein said receiver further comprises:
a second channel selecting means for selecting channels through which desired video and audio signals are transmitted sequentially; and
a channel holding means for holding in reception said channels selected by said second channel selecting means for selecting channels so as to extract successively the desired audio signals from the same channel every predetermined time period delayed by one said time period, once the desired audio signal is received from a corresponding audio channel.

18. A multiplex signal transmission system as claimed in claim 1 further comprising a programmed instruction system.

19. A multiplex signal transmission system as claimed in claim 18, wherein signal groups of signals composed of a plurality of information signals form programmed instructions.

20. A system as claimed in claim 19, wherein said information signals are composed of video signals for displaying still pictures and audio signal accompanied therewith.

21. A multiplex transmission system in which a multiplexed signal composed of a plurality of information signals composed of still picture video signals and corresponding PCM-TDM audio signals, said audio signals having respectively arbitrary time durations and being arranged in time-serial form, is sequentially divided into a plurality of signal portions by a time duration of one master frame period having several sub-frames, each of which includes a plurality of video-audio frames, each of which further includes a video frame and an audio frame having first and second frames, and further wherein a control code frame is assigned to one video frame in each sub-frame so as to control the arrangement of the video and audio frames of relevant information signals to be transmitted and to indicate starting and ending timings of said corresponding audio signals, said signal portions being respectively allocated to a plurality of channels, each of which has a time duration of said one master frame period, in time-parallel form, and said signal portions being transmitted through respective ones of said plurality of time-parallel channels, repeatedly every one master frame period, and in which a video identification code word is contained in a video frame so as to identify the channel code of a relevant channel in which a desired video signal is contained, said video identification code word being positioned in the vertical blanking period of the video frame relating to each video signal, and further including a first control code word indicating an index identifying said information signals, a second control word indicating at least one audio channel number through which an audio signal denoted by said index is transmitted and a third control code word indicating a video identification code word of the still picture video signals denoted by said index which is transmitted in said vertical blanking period of said video frame, and said video identification code word, said second control word and said third control word being sequentially modified to other respectively similar ones in accordance with a shifting of channels of audio signals every time period equal to one master frame period, and including audio start and end signals having code words and inserted in one of said audio frames so that said audio start signal denotes the channel number at which the audio signal starts and said audio end signal denotes the channel number at which the audio signal comes to an end, and wherein said audio start and end signals are modified respectively to other audio start and end signals inserted in other audio signals sequentially in accordance with a shifting of channels of audio signals every time period equal to one master frame period, comprising:
a channel shift means for shifting sequentially the whole of said signal portions allocated to each of said parallel channels every mode-terminal time period; and signal transmitting means applied to outputs derived in time-parallel form from said channel shift means and transmitting simultaneously said outputs through respective channels to each of which said signal portions composing respective audio signals are allocated successively every one master frame period, said channel shift means including a channel shift converter having a gate means for passing therethrough whole audio signals contained in the audio frames, a random access memory for temporarily storing input PCM-TDM audio signals, a signal processor for producing recording signals and control signals which are applied to said random access memory so as to shift sequentially the address in which said PCM-TDM audio signals are written every one master frame, and also producing a bit clock signal for reproducing said PCM-TDM audio signals, which is applied to said random access memory so as to sequentially read out the PCM-TDM audio signals stored in said random access memory, a memory means for storing said video identification code word and said second and third control words which are modified to other respectively similar ones in said memory means in accordance with shifting channels assigned to the PCM-TDM audio signals, and an arithmetic and memory means for storing said audio start and end signals the code words of which are modified to other respectively similar ones in accordance with shifting channels assigned to the PCM-TDM signals.

* * * * *